(12) United States Patent
Budish

(10) Patent No.: US 7,398,229 B2
(45) Date of Patent: Jul. 8, 2008

(54) SYSTEM AND METHOD FOR CONDUCTING ELECTRONIC COMMERCE

(75) Inventor: Eric B. Budish, Somerville, MA (US)

(73) Assignee: Isis Innovation Limited, Summertown, Oxford (GB)

( * ) Notice: Subject to any disclaimer, the term of this patent is extended or adjusted under 35 U.S.C. 154(b) by 592 days.

(21) Appl. No.: 10/860,039

(22) Filed: Jun. 4, 2004

(65) Prior Publication Data

US 2005/0273417 A1 Dec. 8, 2005

(51) Int. Cl.
G06Q 30/00 (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 5,905,975 A * | 5/1999 | Ausubel | 705/37 |
| 6,021,398 A | 2/2000 | Ausubel | |
| 6,023,685 A | 2/2000 | Brett et al. | |
| 6,026,383 A | 2/2000 | Ausubel | |
| 6,041,308 A | 3/2000 | Walker et al. | |
| 6,067,528 A | 5/2000 | Breed et al. | |
| 6,085,169 A | 7/2000 | Walker et al. | |
| 6,101,484 A | 8/2000 | Halbert et al. | |
| 6,141,653 A | 10/2000 | Conklin et al. | |
| 6,167,386 A | 12/2000 | Brown | |
| 6,240,396 B1 | 5/2001 | Walker et al. | |
| 6,243,691 B1 * | 6/2001 | Fisher et al. | 705/37 |
| 6,415,270 B1 | 7/2002 | Rackson et al. | |
| 6,449,601 B1 | 9/2002 | Friedland et al. | |
| 6,564,192 B1 | 5/2003 | Kinney, Jr. et al. | |
| 6,598,026 B1 | 7/2003 | Ojha et al. | |
| 2002/0046037 A1 | 4/2002 | Ausubel et al. | |
| 2002/0082946 A1 | 6/2002 | Morrison et al. | |
| 2002/0095369 A1 * | 7/2002 | Kaplan et al. | 705/37 |
| 2003/0208408 A1 | 11/2003 | Garg et al. | |

OTHER PUBLICATIONS

David Lucking-Reiley "Vickrey Auctions in Practice: From Nineteenth-Century Philately to Twenty-First-Century E-Commerce", Journal of Economics Perspectives, V14, n3, Summer 2000, pp. 183-192.*
Ausubel,. Lawrence,; *An Efficient Ascending-Bid Auction for Multiple Objects Forthcoming*; American Economic Review; Jul. 17, 2002a; pp. 1-30.
Ausubel,. Lawrence; *An Efficient Dynamic Auction for Heterogeneous Commodities*; University of Maryland; Working Paper; Aug. 7, 2002b; pp. 1-25.
Bajari, Patrick and Ali Hortacsu. *Economic Insights from Internet Auctions: A Survey*; NBER Working Paper; , 2003;pp. 1-47.
Budish, Eric B.; *English Auctions with Buy Prices: Irrationality on the Internet?*; Senior Honors Thesis, Amherst College; 2000; pp.

Budish, Eric B. and Paul Klemperer; *Google Should Beware the Winner's Curse;. Financial Times*; May 17, 2004; p. 17.
Budish, Eric B. and Lisa N. Takeyama; *Bidding the Buy Price: Irrationality on the Internet?; Economic Letters* 72, 325-33.; 2001; pp.
Chatterjee, Kaylan and William Samuelson; *Bargaining under Incomplete Information. Operations Research*, 31(5); 1983; pp. 835-851.
Demange, Gabrielle, David Gale, and Marilda Sotomayor; *Multi-Item Auctions; Journal of Political Economy* 94(4); 1986. pp. 863-872.
Bansai Vipul and Rahul Garg; *On Simultaneous Online Auctions with Partial Substitutes*; Research Report; IBM; pp. 1-11.
Kelso, Alexander S. and Vincent P. Crawford; *Job Matching, Coalition Formation, and Gross Substitutes*; Econometrica, 50(6);, 1982; 1483-1504.
Klemperer, Paul; *Auction Theory: A Guide to the Literature; Journal of Economic Surveys*, 13(3); 1999; pp. 227-286.
Dewatripont, L. Hansen and Turnovsky; S.; *Why Every Economist Should Learn Some Auction Theory*; Invited Lecture to 8$^{th}$ World Congress of the Econometric Society; 2003; pp. 1, 25-55.
*What Really Matters in Auction Design; Journal of Economic Perspectives*; 16 (1, Winter); 2002; pp. 169-189.
Lucking-Reiley, David; *Auctions on the Internet: What's Being Auctioned, and How?; Journal of Industrial Economics*, 48(3); 2000; pp. 227-252.
Milgrom, Paul;. *Putting Auction Theory to Work: The Simultaneous Ascending Auctions; Journal of Political Economy*, 108(2); 2000; pp. 245-272.
Milgrom, Paul; *Putting Auction Theory to Work*. Forthcoming; 2003; pp.
Riley, John G. and William F. Samuelson; *Optimal Auctions. American Economic Review*, 71(Jun. 3); 1981; pp. 381-392.
Roth, Alvin E. and Axel Ockenfels;. *Last-minute Bidding and the Rules for Ending Second-price Auctions: Evidence from eBay and Amazon auctions on the Internet; American Economic Review*, 92 (Sep. 4); 2002; pp. 1093-1103.
Rustichini, Aldo, Mark A. Satterthwaite and Steven R. Williams; *Convergence to Efficiency in a Simple Market with Incomplete Information; Econometrica* 62(5); 1994. pp. 1041-1063.
Vickrey, William; *Counterspeculation, Auctions, and Competitve Sealed Tenders;.Journal of Finance*, 16(Mar. 1); 1961; pp. 8-37.
Wurman, Peter, Wurman, Peter; *The Michigan Internet AuctionBot: A Configurable Auction Server for Human and Software Agents; Proceedings of the Second International Conference on Autonomous Agents*; 1998; pp. 301-308.

(Continued)

Primary Examiner—Naeem Haq
(74) Attorney, Agent, or Firm—Guerin & Rodriguez, LLP

(57) ABSTRACT

An electronic person-to-person double auction-like system that facilitates trade in many differs sorts of item via the World Wide Web or similar such interface. A plurality of sellers can post details of items for sale, including a minimum bid amount and buy price for each. A buyer can create a bid basket comprising bids in respect of a plurality of heterogeneous items available for sale, together with bid-withdrawal rules defining circumstances in which respective bid(s) are to be withdrawn. Bids are binding unless withdrawn. The auction for any item continues until a buyer posts the buy price therefor or the seller accepts a bid posted therefor.

20 Claims, 13 Drawing Sheets

OTHER PUBLICATIONS

Wurman, Peter, Wurman, Peter; *A Parameterization of the Auction Design Space; Games and Economic Behavior*, 35; 2001; pp. 304-338.

Steiner, David; Auctionbytes.com.; *The Most Popular Day to End an Auction? The Results are In!* Feb. 22, 2004; pp.

Noto, Anthony; .Goldman Sachs Research; *eBay: Strength Persists Despite Seasonality*; Sep. 18, 2003; pp.

Varian, Hal R.; New York Times; *Economic Scene: Online Users as Laboratory Rats*; Nov. 16, 2000; C2.

Belson, Ken; New York Times; *Digital Dealmakers Meet in the Middle*; Sep. 11, 2003; p. G1.

Tedeschi, Bob; New York Times; *E-Commerce Report: Comparison Shopping Sites try to Broaden Customer Base*; Sep. 22, 2003; p. C5.

Tedeschi, Bob; New York Times; *Hear this, procrastinators. More online merchants say they can deliver the goods for last-minute shoppers*; Dec. 8, 2003; p. C8.

Grimes, William; New York Times; *That Invisible Hand Guides the Game of Ticket Hunting*; Jun. 18, 2004; p. E1.

Wingfield, Nick; Wall Street Journal; *As eBay Grows, Site Disappoints Some Big Retailers: Offering many Identical Items Undercuts Price for Sellers like Inventory Liquidators*; Feb. 26, 2004; p. A1.

Freeman, Adam L.; Wall Street Journal; *Priceline Discovers that Choice Really Does Matter to Consumers*; Apr. 21, 2004; p. B4.

Bansai Vipul and Rahul Garg; *On Simultaneous Online Auctions with Partial Substitutes*; Research Report; IBM; pp. 1-11, 2002.

Kelso, Alexander S. and Vincent P. Crawford; *Job Matching, Coalition Formation, and Gross Substitutes*; Econometrica, 50(6);, 1982; 1483-1504.

Klemperer, Paul; *Auction Theory: A Guide to the Literature; Journal of Economic Surveys*, 13(3); 1999; pp. 227-86.

Dewatripont, L. Hansen and Turnovsky; S.; *Why Every Economist Should Learn Some Auction Theory*; Invited Lecture to 8$^{th}$ World Congress of the Econometric Society; 2003; pp. 1, 25-55.

*What Really Matters in Auction Design; Journal of Economic Perspectives*; 16(1, Winter); 2002; pp. 169-89.

\* cited by examiner

SYSTEM OVERVIEW

Fig. 2
OBJECT STRUCTURE

Object Trader
- Personal_Characteristics
- Active Bid_Baskets: 
- Active Items_For_Sale: 
- Transaction_History
- Active_Contractual_Agreements
- Reputation_and_Feedback

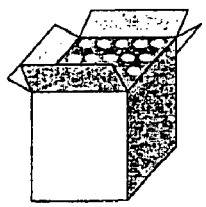

Object Item_For_Sale
- Trader Seller: 
- Item_Characteristics
- Bidding_Information
- Bid_History

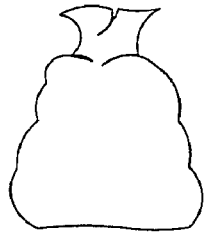

Object Bid
- Trader Buyer: 
- Item_For_Sale MyItem:
- Bid_Amount
- Bid_Status

Object Bid_Basket
- Bid_Basket_Name
- Trader Buyer:
- Bid_Withdrawal_Rule
- Bid_Basket_Status
- Bids = {Bid A, Bid B, ...}:

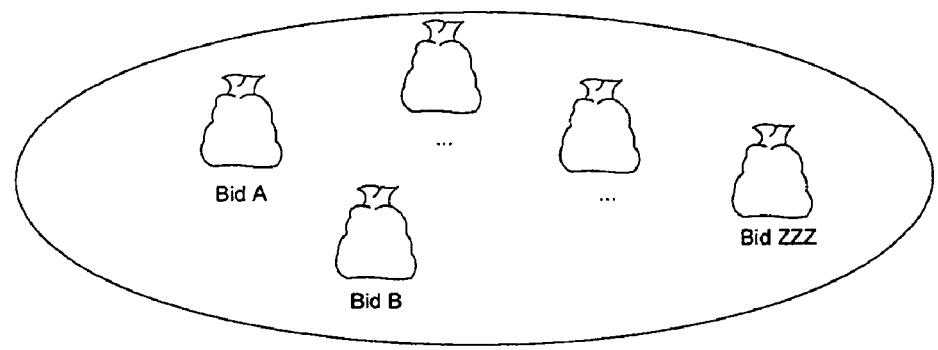

SITE OVERVIEW

BUYER AND SELLER
BASIC ACTIONS

BUYER SEARCH

BUYER ADJUST

BUYER LOOP: GET BID BASKET ITEM INPUTS

SELLER CREATE

SELLER ADJUST ITEM

SYSTEM SUBMIT BID BASKET

SYSTEM CHECK BID-WITHDRAWAL RULE

SYSTEM RUN BID-WITHDRAWAL RULE FOR WINNER

SYSTEM AND METHOD FOR CONDUCTING ELECTRONIC COMMERCE

BACKGROUND OF THE INVENTION

1. Field of the Invention

This invention relates to electronic commerce across a communications network such as the Internet and, more particularly, to the facilitation of transactions between buyers and sellers in a communications environment, such as the World Wide Web. Aspects of the invention relate to the conduct of an automated auction, market-making and person-to-person ("P2P") electronic commerce.

2. Background Information

A number of auction formats are well known in the fields of auction theory and internet commerce, as will be discussed in more detail below.

The simplest auction situation that is studied in the art consists of a single seller, with a single item for sale, who must design a mechanism optimally to sell that item to one of many ("n") bidders. Many different auction formats can be used in this situation, of which four are paradigmatic. The most well known and widely used is the "English", or ascending auction, in which the bidding level is progressively raised (either by the bidders themselves in the case of an "outcry" auction, or by an electronic clock in the "Japanese" English auction) until just one bidder remains, who then pays her bid for the item. In the "Dutch", or descending auction, the bidding level starts very high and is progressively lowered (typically by an electronic clock) until someone bids, and that bidder pays the current level for the item. In the first-price sealed-bid auction, prospective buyers have a single chance to bid, and the seller sells the item to the high bidder for the amount she bid. Finally, in the second-price sealed-bid, or "Vickrey" auction (Vickrey, 1961), the seller again sells the item to the high bidder, but for the amount of the second highest bid.

These formats each have strengths and weaknesses, and which is best typically depends on the nature of the item, the nature of bidders' information about the item, the seller's and buyers' risk preferences, and implementability issues, such as transaction costs, political pressures, ease of understanding, whether bidders might be able to collude or deter entry, and whether the seller can credibly commit to the rules of the game.

Sellers can often use reserve prices to set a minimum amount for which they will sell their item. Reserve prices can be revealed to buyers, or can be kept hidden from buyers (in which case they only find out ex post whether the reserve has been met) depending on the circumstances. The functional opposite of the reserve price is known as the "Buy Price". Buy prices are the auction formalization of notices like "$50 or best offer" which often appear in yardsales or classified advertisements. The winner is the first bidder to bid the buy price, or, if none, the otherwise highest bidder (assuming such bid is above the reserve price, if any).

Another auction situation studied in the art is the procurement auction, in which there is a single buyer of some item and many ("n") potential sellers (e.g. a B2B sourcing auction). This auction situation is theoretically analogous to the first, and many of the same formats and techniques are applied to its study and usage.

Another auction situation studied in the art is the case of a single seller, selling multiple items ("k") to many buyers ("n"). If the k items are identical ("homogeneous"), and buyers have unit demand (i.e. want just one item each), then the auction situation is theoretically quite similar to the first. More complicated is when the items are not identical ("heterogeneous"), and/or when they might be complements or substitutes for the buyers (who will not generally have unit demand). In such case, auctioning the items individually is potentially problematic, both in terms of revenue generation for the seller, and efficient allocation of resources for society. Instead, it is generally thought best to auction the items simultaneously.

A simultaneous ascending auction consists of k individual ascending auctions, but with the stipulation that all of the auctions end simultaneously, when in some round no bid is received in any auction.

Another possibility is the package auction, in which bidders bid on one or more "packages" of items, either in sealed-bids or in an ascending auction setting. This is an area of active research, because of its importance in a wide variety of high-stakes applications.

Another auction situation studied in the art is the case of many sellers ("m") selling one or more of a homogeneous item to many buyers ("n"). This situation typically calls for a double auction, in which both buyers and sellers submit bids, and trade occurs at a single market-clearing price. Determining this price is non-trivial: in the case where buyers and sellers each submit a bid $s_i$ for the trade of a single unit of the good (buyers bid a maximum willing-to-pay, sellers a minimum willing-to-accept), then any price between the $m^{th}$ and $m+1^{th}$ highest bids ($s_{(m)}$ and $s_{(m+1)}$, respectively) inclusive will clear the market. A "k-double auction" specifies a parameter k between 0 and 1 inclusive that determines which market clearing price is selected (specifically, $p=(1-k)s_{(m)}+ks_{(m+1)}$). The choice of parameter impacts the strategies of the buyers and sellers. The k-double auction is a model of a "call market," e.g. the setting of the daily opening price of each stock on the New York Stock Exchange.

It should be noted that the opening trading of each stock in the NYSE constitutes a separate, homogeneous item, double auction. (Trading after the opening is more difficult to model because of arrival and timing issues, but is related to a homogeneous item double auction). A buyer who wants to buy shares, for example, in Microsoft or Intel, but not both (e.g. because of budget-restrictions or transaction-cost efficiency reasons), must solve a complex optimization problem across multiple auctions. One solution may be to bid at an aggressive level for both, and then, as soon as one bid is successful, withdraw the other. But this strategy exposes the bidder to risk that either no trade is consummated, or both (if the timing is coincident).

Double auctions for heterogeneous items have not thus far been studied in the art. Note that if the many sellers could collectively hire an intermediary, who would then auction their items simultaneously to the buyers, we would be in the single-seller-n-buyers framework discussed above, and a mechanism such as the simultaneous ascending auction would perform well in terms of both revenue generation for the sellers and allocative efficiency for the buyers.

It is an object of the present invention to provide a double auction-like mechanism for heterogeneous items. Double auctions for heterogeneous items are of particular interest in situations whereby the above-mentioned intermediation is difficult or impossible. Person-to-person internet commerce is one such market where intermediation is difficult, and other examples are given later.

SUMMARY OF THE INVENTION

In accordance with a first aspect of the present invention, there is provided computer-implemented apparatus for conducting an automated auction in respect of one of a plurality of respective items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software being arranged and configured to enable:

a) entering by or on behalf of a plurality of sellers, via respective entry terminals, items to be offered for sale in respective auctions, together with a user-defined buy price in respect of each item;
  b) posting by or on behalf of a plurality of buyers, via respective entry terminals, bids associated with said respective items, said bids being binding unless withdrawn; and
  c) continuing an auction in respect of an item until a buyer posts a bid equal to the buy price thereof, or the seller associated with said item accepts a bid posted by a buyer in respect thereof, or the seller associated with said item withdraws said item from sale.

In a preferred embodiment, said bids posted by or on behalf of said buyers have associated therewith respective bid-withdrawal rules defining circumstances in which respective bids are to be withdrawn.

The apparatus may be further arranged and configured to enable posting, by or on behalf of a buyer, bids in respect of a plurality of respective items together with respective bid-withdrawal rules, each bid-withdrawal rule specifying that the associated bid is to be considered to be withdrawn in the event that any one of the other said bids is accepted.

The apparatus is beneficially arranged and configured to enable a seller to enter a plurality of items to be offered to sale in the form of a bundle, and to enable a buyer to post one or more bids in respect of the whole or selected portions of said bundle. Preferably, the apparatus is further arranged and configured to enable a buyer to post a bid in respect of an item which includes an offer price and one or more other conditions of said offer price.

In one exemplary embodiment, the apparatus may be further arranged and configured to enable buyers to enter, via said entry terminals, items required for procurement.

The apparatus may be further arranged and configured to enable a seller to enter an item for sale together with a supply-withdrawal rule defining circumstances in which said item is to be withdrawn from sale.

Beneficially, said bid-withdrawal rules are user-definable. Said bid-withdrawal rules may also be variable during the course of an auction.

Said buy price in respect of an item is beneficially variable by or on behalf of a seller associated therewith during the course of an auction.

In a preferred embodiment, bids must be less than or equal to said buy price.

Preferably, the apparatus is further arranged and configured to enable a minimum bid price, less than said buy price, to be defined in respect of an item for sale, wherein allowable bids posted by or on behalf of said buyers must be between said minimum bid price and said buy price inclusive.

Also in accordance with the first aspect of the present invention, there is provided a computer-implemented method for conducting an automated auction in respect of one of a plurality of respective items for sale in a system including a plurality of entry terminals operable by respective buyers and sellers, a database containing information relating to said buyers and sellers and items for sale via an auction, and a processor, wherein said database is communicably coupled to said entry terminals, the method being for conducting said automated auction using said information contained in said database and for facilitating a transaction between said a buyer and a seller as a result of said auction, and comprising:

a) entering by or on behalf of a plurality of sellers, via respective entry terminals, items to be offered for sale in respective auctions, together with a user-defined buy price in respect of each item;
  b) posting by or on behalf of one or more of a plurality of buyers, via one or more respective entry terminals, bids associated with respective items, said bids being binding unless withdrawn; and
  c) continuing an auction in respect of an item until a buyer posts a bid equal to the buy price thereof, or the seller associated with said item accepts a bid posted by a buyer in respect thereof, or the seller associated with said item withdraws said item from sale.

In accordance with a second aspect of the present invention, there is provided computer-implemented apparatus for conducting an automated auction in respect of one of a plurality of respective items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software being arranged and configured to enable:

a) entering by or on behalf of a plurality of sellers, via respective entry terminals, items to be offered for sale in respective auctions, together with a user-defined buy price in respect of each item;
  b) posting by or on behalf of a plurality of buyers, via respective entry terminals, bids associated with one or more respective items together with bid-withdrawal rules defining circumstances in which respective bids are to be considered withdrawn, said bids being otherwise binding, and wherein said bid-withdrawal rules are user-definable; and
  c) continuing an auction in respect of an item until a buyer posts a bid equal to the buy price thereof, or the seller associated with said item accepts a bid posted by a buyer in respect thereof, or the seller associated with said item withdraws said item from sale.

In accordance with a third aspect of the present invention, there is provided computer-implemented apparatus for conducting an automated auction in respect of one of a plurality of respective items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software being arranged and configured to enable:

a) entering by or on behalf of a plurality of sellers, via respective entry terminals, items to be offered for sale in respective auctions, together with a user-defined buy price in respect of each item; and b) posting by or on behalf of a single buyer, via a respective entry terminal, a bid basket comprising a plurality of bids associated with a plurality of respective items together with respective bid-withdrawal rules, each bid-withdrawal rule specifying that the associated bid is to be withdrawn in the event that any other bid in said bid basket is accepted, said bids being otherwise binding.

In accordance with a fourth aspect of the present invention, there is provided computer-implemented apparatus for conducting an automated auction in respect of one of a plurality of respective items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software being arranged and configured to enable:

a) entering by or on behalf of a plurality of sellers, via respective entry terminals, items to be offered for sale in respective auctions, together with a user-defined buy price in respect of each item, wherein the buy price of an item is variable during the course of a respective auction;

b) posting by or on behalf of a plurality of buyers, via respective entry terminals, bids associated with a respective item together with bid-withdrawal rules defining circumstances in which respective bids are to be considered withdrawn, said bids being otherwise binding; and c) continuing an auction in respect of an item until a buyer posts a bid equal to the buy price thereof, or the seller associated with said item accepts a bid posted by a buyer in respect thereof, or the seller associated with said item withdraws said item from sale.

In accordance with a fifth aspect of the present invention, there is provided computer-implemented apparatus for conducting in respect of a single buyer a plurality of automated auctions in respect of a plurality of respective heterogeneous items for sale in a system including a plurality of entry terminals operable by respective buyers and sellers and a database containing information relating to said buyers and sellers and items for sale, wherein said database is communicably coupled via the Internet to said entry terminals, the apparatus comprising an Internet auction site for conducting said automated auctions using said information contained in said database and to facilitate a transaction between said buyer and one of said sellers as a result of one of said auctions, the Internet auction site being arranged and configured to enable:

a) entering by or on behalf of a plurality of sellers, via respective entry terminals, data relating to respective heterogeneous items to be offered for sale; and b) posting by or on behalf of a single buyer, via an entry terminal, a bid basket comprising bids respectively associated with a plurality of heterogeneous items together with bid-withdrawal rules defining circumstances in which respective bids are to be considered to be withdrawn, said bids being otherwise binding.

Beneficially, the apparatus may be further arranged and configured to terminate an auction in respect of an item when the seller associated with said item accepts a buyer's bid for said item, or when a buyer bids the seller's buy price for said item, or when a buyer withdraws a bid for said item.

Data relating to a heterogeneous item to be offered for sale preferably includes a user-defined buy price in respect of said item.

An auction for an item may be terminated, in accordance with one preferred embodiment of the present invention, when said buyer posts a bid equal to the buy price for said item.

In accordance with a sixth aspect of the present invention, there is provided a method for conducting in respect of a single buyer a plurality of automated auctions in respect of a plurality of respective heterogeneous items for sale in a system including a plurality of entry terminals operable by respective buyers and sellers and a database containing information relating to said buyers and sellers and items for sale, wherein said database is communicably coupled via the Internet to said entry terminals, the method comprising providing an Internet auction site for conducting said automated auctions using said information contained in said database and to facilitate a transaction between a buyer and one of said sellers as a result of one of said auctions, the Internet auction site being arranged and configured to enable:

a) entering by or on behalf of a plurality of sellers, via respective entry terminals, data relating to respective heterogeneous items to be offered for sale;

b) posting by or on behalf of a buyer, via an entry terminal, a bid basket comprising bids respectively associated with a plurality of heterogeneous items together with bid-withdrawal rules defining circumstances in which respective bids are to be considered to be withdrawn, said bids being otherwise binding; and c) terminating all of said auctions when a seller associated with an item accepts said buyer's bid for said item.

In accordance with an seventh aspect of the present invention, there is provided computer-implemented apparatus for conducting an automated auction in respect of one of a plurality of respective items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software being arranged and configured to enable:

a) entering by or on behalf of a plurality of sellers, via respective entry terminals, items to be offered for sale in respective auctions, together with a user-defined buy price and a supply-withdrawal rule in respect of each item, said supply-withdrawal rules defining circumstances in which respective items are to be considered withdrawn;

b) posting by or on behalf of a plurality of buyers, via respective entry terminals, bids associated with said respective items together with bid-withdrawal rules defining circumstances in which respective bids are to be considered withdrawn, said bids being otherwise binding; and c) continuing an auction in respect of an item until a buyer posts a bid equal to the buy price thereof, or the seller associated with said item accepts a bid posted by a buyer in respect thereof, or the seller associated with said item withdraws said item from sale.

These and other aspects of the present invention will be apparent from, and elucidated with reference to the embodiments described herein.

BRIEF DESCRIPTION OF THE DRAWINGS

An embodiment of the present invention will now be described by way of example only and with reference to the accompanying drawings, in which:

FIG. 2 is a schematic illustration of the object structure used in an auction system according to an exemplary embodiment of the present invention;

DETAILED DESCRIPTION OF THE INVENTION

Figure 1:
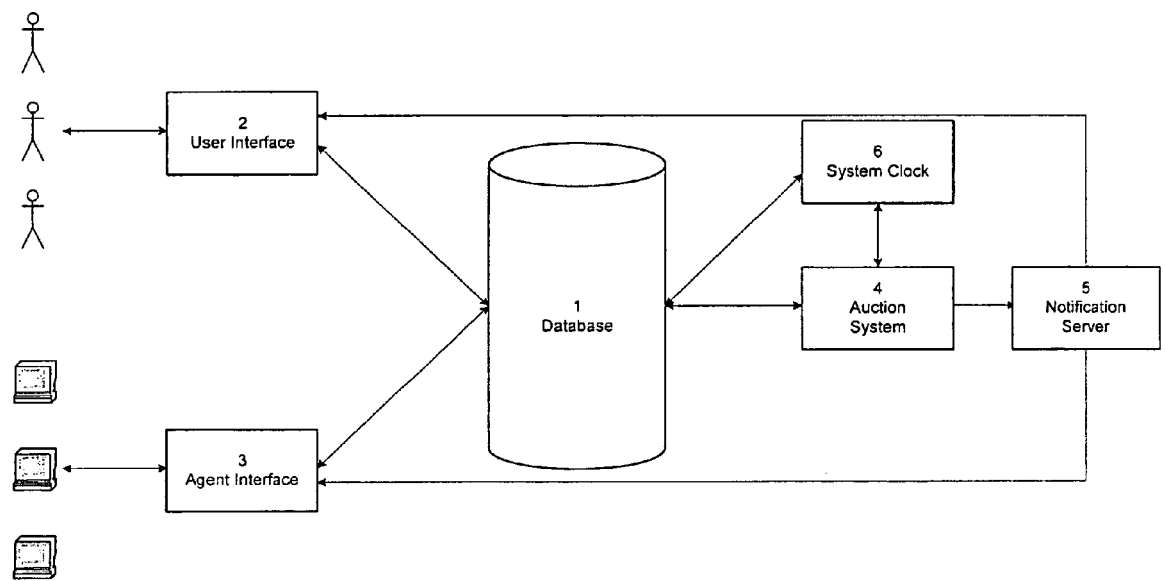
FIG. 1 is a schematic block diagram illustrating an overview of an auction system.

The most well known and successful Internet auction firm is eBay. The basic eBay auction format is the ascending auction, but with two important modifications. First, bidders are allowed to instruct an electronic proxy to keep bidding for them up to a specified dollar amount. This feature lowers transaction costs for bidders, because they do not have to constantly monitor their auction. Second, auctions end at a fixed time. This gives a sealed-bid flair to the final moments of the auction, when last-minute "snipers" compete quite dramatically for the item at auction. EBay allows several variations on its standard format. In addition to a publicly known minimum bid, sellers may set a secret reserve price, as discussed above. Sellers may opt to sell their item at a fixed price, instead of by auction, by using the "Buy It Now" option. Buy It Now can also be used by sellers to allow the first bidder to decide whether to bid the fixed price and win the item immediately, or make an opening low bid, and then the auction proceeds as if there were no fixed price. Buy It Now is different from Buy Prices in this respect. EBay also allows sellers to sell multiple homogeneous items (for which there typically is unit demand) via what they call a Dutch auction, but what in the theoretical art is called a Vickrey auction, because the highest unsuccessful bid determines the clearing price.

There are many other Internet auction sites with substantially similar offerings to eBay's. Some of the important areas of difference are: category offerings; whether the auctions end at a fixed time or are extended by last-minute bids; whether the items are sold by other users or by the site itself; whether they use a Buy Price (as defined above).

The main weakness of the format described above is that it allows unit-demand buyers to bid on only one item at a time (lest they risk buying more than they want). (Note that bidders are not allowed to withdraw bids other than in exceptional circumstances. See, e.g., http://pages.ebay.com/help/buy/bid-retract.html) Thus, if a bidder's demand is for a type of item (e.g. a digital camera), within which there are multiple brands and models that would be satisfactory to the buyer, the buyer is precluded from benefiting from the full breadth of his demand across heterogeneous products.

Much P2P trade on the Internet is facilitated by bulletin board and classified listings sites. On such sites, users post descriptions of items for sale, asking prices, and contact information. Often they effectively use a Buy Price, asking "$50 or best offer", but it is important to note that their Buy Price cannot be binding: if bidder A offers $50, and then bidder B, learning the Buy Price has been bid, offers $60, the seller cannot credibly commit to ignore B's attractive offer. Many of these sites are organized around localized geographies, e.g. universities and cities, facilitating the trade of items that are too bulky to ship cost-effectively over long distances.

If we look to the business-to-consumer commerce ("B2C") space, we find several more innovations in the art.

Priceline.com's "name your price" reverse auctions allow users to submit a binding bid for some item category (e.g. flight to San Francisco on a specified date), which vendors are allowed to accept on a first-come first-served basis. The structure is similar to a procurement auction, in that there is 1 buyer, and many sellers, but with two important differences. First, the buyer does not get the benefit of competitive auction pricing—it is as if he has set his reserve price equal to his Buy Price. Second, even though there is some heterogeneity within a product category—e.g. direct flights are preferred to connecting flights—the bidder is not allowed to reflect this heterogeneity in his bid, e.g. by offering a $25 premium for a direct flight.

Many sites function as "shopping agents", connecting buyers to several prospective seller's offerings simultaneously. Such sites allow buyers quickly to compare prices and other specifications such as shipping costs and delivery time across a large number of prospective sellers. If some seller's offering is attractive enough, the buyer typically will click-through to that seller's own website, completing the transaction therein.

U.S. Pat. No. 6,598,026 describes a state-of-the-art shopping agent system. Compared to internet auction marketplaces, including the present invention, the shopping agent model suffers several important weaknesses.

First, all offers by buyers and sellers are non-binding. This is a consequence of the fact that trade is consummated not on the shopping agent site, but on the seller's own e-commerce site. The shopping agent serves as a non-binding information intermediary, directing prospective buyers to potentially attractive offers available on external sites. Since sellers' displayed offers are non-binding, buyers often find that the best offers are shams—e.g., the too-good-to-be-true price on a camera is available only if several overly priced accessories are purchased along with it.

Second, sellers do not define item types, the shopping agent does. This significantly narrows the variety of items available in the marketplace. For example, a shopping agent might define an item type for a particular model of camera, say model A. The shopping agent then facilitates non-binding price comparison across various vendors of new model A cameras. In many internet auction marketplaces, including the present invention, sellers get to define their item types. This means that in addition to new model A cameras, sellers may offer used model A cameras, new model A cameras with various accessory bundles, parts for model A cameras, etc. Fundamentally, shopping agents are designed for a relatively small number of relatively large sellers (typically sophisticated e-commerce vendors) selling standardized products, whereas auction marketplaces have both large and small sellers selling both standardized and idiosyncratic products.

Third, buyers do not compete against other buyers. Each buyer's experience is 1-buyer, m-seller, as in procurement (though in procurement, the buyer defines his exact requirements, and sellers' bids are binding). Especially when products are heterogeneous, reaching the efficient allocation of objects to buyers requires competition amongst buyers.

Fourth, price comparison is facilitated only within an item type, not across item types. Bidders pick whether they are interested in camera model A or B, and only then they compare prices from different sellers of the camera they selected. It is difficult to compare directly whether better terms are generally available for A or B.

Yet another site concept, that appears to have failed, is that of the "group buying collective". On such sites, buyers' demand is aggregated to secure a uniform, discounted price from a single seller. Often, the price would decline as demand builds encouraging current buyers to prospect for additional buyers.

A new development in B2C commerce is "negotiation agents", which allow buyers to enter into "negotiations" (i.e. offers and counter-offers) with one or more potential sellers. Typically, these negotiations are parametrized similarly to the k-double auction discussed above: if the buyer's offer is above the seller's secret reserve price, a transaction is consummated at some point in between. Often, k is set equal to one-half (e.g. "splitthedifference.com"), or is randomized so as to disguise the offer information. The sellers in such negotiations pre-program their negotiating techniques, i.e. whether and by how much to lower their asking price, as a function of the buyer's offer. One difficulty all negotiation sites face is preventing users from so-called "gaming the system", i.e. attempting to deduce what one's opponents' negotiation algorithm is, and responding optimally. For example, if one suspects a seller is using a hidden reserve price, and will sell if offered any price above that reserve at some point in between, the optimal buying strategy is first to offer a very low amount, then slightly more, etc. Often, buyers will use multiple ID's, email addresses, and credit cards to prevent such behaviour from being detected.

The present invention provides an electronic person-to-person double auction-like system that facilitates trade in many different sorts of items, via the World Wide Web or similar such interface. The items best suited to the system will share several features, including, but not limited to, the availability of close substitutes, and good pricing and value information, often from the pricing of such substitutes.

Double auctions for heterogeneous items are of particular interest in situations whereby the above-mentioned intermediation is difficult or impossible.

Buyers submit linked collections of contingently-binding bids. The collections of bids are called "bid baskets". Buyers are protected from winning more items or spending more money than they want by "bid-withdrawal rules". Sellers set flexible asking prices, called "buy prices", and accept attractive bids. Trade occurs whenever a bidder bids the buy price, or a seller accepts a bid. Sellers have incentive to accept bids, because attractive bids may be withdrawn if the bidder behind them wins another item instead. The dynamics are similar to a stock market, except there is no intermediary determining which items are similar to each other. Buyers make this determination themselves, via their bid baskets and bid-withdrawal rules.

The best way to describe an auction method according to an exemplary embodiment of the present invention is to describe what actions buyers and sellers are allowed to take, and the dynamics these activities create.

Activity of Sellers (s1) Post items for sale. Sellers set a minimum bid amount, a buy price (maximum bid amount, which immediately ends the auction if bid), and enter item information such as a brief description, picture, etc.

(s2) Adjust the minimum bid and buy price amounts. Sellers can adjust these amounts at any time over the course of their auction, either upwards or downwards.

(s3) Accept the current high bid ("bid price"), immediately ending the auction for that item at that price.

Activity of Buyers (b1) Bid the buy price on any item, immediately winning the auction for that item at that price.

(b2) Create and submit a bid basket. A bid basket consists of a collection of bids (each bid specifies an item and an amount), and a bid-withdrawal rule. A simple example of a bid-withdrawal rule is "Withdraw all my other bids, as soon as any one is successful".

(2) Example. Suppose the bidder wants a used digital camera of model A or B, and that there are m-a and m-b sellers of each, respectively. The bidder simultaneously submits bids on cameras $A_1, A_2, \ldots A_{m-a}, B_1, B_2, \ldots B_{m-b}$, and creates the rule that, as soon as she wins one auction, her other bids are withdrawn. In this way, she does not risk winning multiple auctions.

(3) If the buyer's bid is higher than the current high-bid (the bid price) by one or more bidding increments, her bid becomes the new bid price. Otherwise, her bid is held in reserve, potentially becoming the bid price if the higher bidders withdraw their current bids.

(b3) Adjust their existing bid baskets, by adjusting the bid amounts in either direction, adding new items, deleting items, or changing the bid-withdrawal rule. If the buyer wishes to adjust several bids in a bid basket, he can do so simultaneously.

Definitions of Bid Baskets and Bid-Withdrawal Rules (d1) A bid basket is a buyer-defined collection of bids, associated with a bid-withdrawal rule. The buyer may submit all bids in a bid basket simultaneously, and is allowed to edit the bids in a bid basket simultaneously as well.

(d2) A bid-withdrawal rule is a simple buyer-specified algorithm that specifies when certain or all bids in a bid basket are withdrawn. Following are some examples:

(4) Single Unit Rule: the buyer specifies that all bids are withdrawn, as soon as a single one is successful.

(5) Multiple Unit Rule: the buyer specifies that all bids are withdrawn, as soon as a specified number are successful.

(6) Fixed Budget Rule: the buyer specifies a budget limit, and any currently outstanding bids which, if accepted, would put the bidder over this budget, are withdrawn. Example: bid $30, $40, $50 for items A, B, C, respectively, with budget of $75. If bid C is accepted, bids A and B are withdrawn. But, if bid A is accepted first, only bid C is withdrawn, because bid B could be accepted with the bidder still under budget.

(7) Time Rule: the buyer specifies a date on which all bids are withdrawn (bid withdrawal would occur at 2 AM PST, to minimize global disruption).

(8) Combination Rule: the buyer specifies a combination of an items-demanded parameter, budget limit, and time limit. Examples: buy at most 2 items and spend at most $50; buy at most 2 items, spend at most $50, and withdraw bids on January 1.

(9) More complicated bid-withdrawal rules could be permitted in other potential embodiments.

Process and Dynamics of the Auctions

At any time, for any yet-unsold item, there is a buy price, a minimum bid amount, and a (possibly empty) collection of bids. Together, the highest bid and buy price constitute a bid-ask spread. The bid-ask spread fluctuates with new bids, bid withdrawals, and bid, buy price and minimum bid adjustments.

An item is sold whenever (b1) some bidder bids the buy price, or (s3) the seller accepts the current high bid. When either b1 or s3 occurs, (i) the auction ends, and buyer and seller are notified that they have agreed to trade and at what price; (ii) the auction system runs the bidder-defined bid-withdrawal algorithm.

Note that there is no time limit as such. An open design decision is how best to facilitate speedy trade. Possibilities include:

a) Activity rule. Example: if there is no bid activity for X units time then the seller must either accept the current high bid, lower the buy bid, or withdraw the item.

b) Fee structure. The listing fee could be on a per unit time basis.

An open design decision in implementing this auction is what information to make viewable to users other than the seller over the course of the auction. The bid-ask spread will always be publicly viewable. Other options include the identity of the high bidder, bids other than the high bid, and the history of bidding.

EXAMPLE

Albert wants to buy one camera. Currently, Anne, Betty, and Caroline are selling their cameras on the auction site. Call these cameras A, B and C. Anne has set a buy price of $200, Betty of $225, and Caroline of $250, and each seller has set a minimum bid of $100. Albert's first decision is whether or not to buy one of the cameras at the buy price set by the seller. Say he chooses not to. Instead, he decides to submit a "bid basket" for the three cameras. He bids $150 for A, $150 for B, and $180 for C, and sets the bid-withdrawal rule of "withdraw my other bids as soon as any one is successful. His bids reflect the fact that he prefers C to B or A, but that he is happy to win A or B at an attractive enough price.

Anne, Betty, and Caroline see Albert's bids for their items, because he is the current high bidder. Each seller can choose at any time to accept Albert's bid for their item, in which case their auction is closed and Albert's other bids are withdrawn. Say for the moment they choose not to, hoping a new higher bidder comes along or that Albert raises his bid.

Next, Bob visits the auction site. He too wants to buy one camera, really likes camera A at price $200, so he decides to bid the buy price. Now Anne's auction is over, and Albert is notified that his bid for A was unsuccessful. This prompts Albert to raise his bids for B and C to $160 and $190, but Betty and Caroline still do not accept his bids.

Next, Charlie visits the auction site. He wants to buy one camera, so he specifies a unit-demand bid-withdrawal rule and bids $170 for B, and $180 for C. Now Charlie is the high bidder for B, but Albert is still the high bidder for C. If Betty wants to accept a bid, she would accept Charlie's bid not Albert's.

Next, Debby posts her camera, D, on the web site, and sets buy price $250. Albert likes Debby's camera a lot, so he adds it to his bid basket. He also decides that since he likes D so much, he wants to bid less for B, so he lowers his bid for B back to $150. His bid basket is now $150 for B, $190 for C, and $200 for D, with a unit-demand bid-withdrawal rule. Debby decides to accept Albert's offer, so he successfully has purchased camera D for $200, and his bids for B and C are withdrawn. This means that Charlie is now the high bidder for C. Say Caroline decides to accept his bid for $180 for C. This means Charlie has won item C for $180, and that his bid for B is withdrawn.

To summarize: Albert has bought from Debby for $200, Bob from Anne for $200 (her buy price), and Charlie from Caroline for $180. Each buyer got his most preferred object, at a mutually acceptable price. While it will not generally be the case that buyers get their most preferred object—what if both Albert and Bob most preferred Debby's camera—it will generally be the case that buyers likely get the object which represents their best price-object combination. Betty's camera is still for sale, with minimum bid $100, buy price $225, and no active bids. Betty may choose to lower her buy price if demand for B continues to be weak.

It is useful here to discuss the difference between an auction method according to the invention and a stock market. Since each individual stock in a stock market is traded by continuous double auction, we can understand the stock market as a whole as a massive parallel collection of double auctions. There is one auction market for Microsoft shares, another for Intel shares, etc. In each auction market, buyers submit bids and sellers submit asks, and trade occurs when either a buyer meets a seller's ask, or a seller meets a buyer's bid. This is very similar dynamic to the Invention's, where trade occurs when either (s3) or (b1) (defined above) occurs.

There are two important differences. The first difference is in the nature of the markets. In a stock market, the intermediary plays a confirmatory rule—if Albert and Bob both indicate that they want to buy Microsoft shares, and Anne and Betty both want to sell Microsoft shares, the intermediary can confirm that they all wish to buy and sell the same commodity. In our auction, the intermediary does not play this role. Even if Anne and Betty are selling identical cameras, Albert and Bob have to indicate, using bid baskets, that their demand is for either.

The second difference is that in the invention's auction method, buyers are able to link their demand across heterogeneous auction markets using bid baskets and bid-withdrawal rules. Note that Anne and Betty each constitute a separate auction market. Albert and Bob get to link their demand across these markets using bid baskets and bid-withdrawal rules.

On a stock market, if Albert demands shares of Microsoft, he does not need to link his demand for Anne's shares of Microsoft and Betty's shares of Microsoft. However, suppose Caroline is selling shares of Intel, and Albert demands shares of Microsoft or shares of Intel, but not both. Albert must solve a complex optimization problem across two double auction markets. The method of the invention would in principle be useful for Albert in this situation. He could submit a bid basket for Anne's, Betty's, and Caroline's shares, with a properly specified bid-withdrawal rule.

Furthermore, it should be noted that the concept of bid baskets, and bid withdrawal rules would not work in standard-format auction systems (see Example below) because this type of auction ends at a particular time, whereas, in the system according to this exemplary embodiment of the invention, auctions end upon a buyer or seller action.

Example of What Would Happen If the Concept of Bid Baskets and Bid-Withdrawal Rules were Incorporated into a Prior Art Auction System Suppose Anne, Betty, and Caroline sell their cameras in a traditional internet auction marketplace, and that Albert wants to buy one camera. He may wish to bid $150 for Anne's camera, $150 for Betty's, and $180 for Caroline's. He can't just bid for all three cameras, because then he might win all three. He could bid on Anne's, and if he loses then bid on Betty's, and if he loses then bid on Caroline's. He could even instruct a proxy agent to do this for him, for a fee (www.auctionsniper.com). But this is very different from submitting a bid basket and bid-withdrawal rule.

The first difference is that Betty doesn't receive Albert's bid until after Anne's auction is over (since most of the bidding on eBay occurs in the final minutes, Albert won't find out if he's won or lost until the very end). So if Albert and Betty make an efficient match, that is, Albert's $150 bid is very attractive to Betty, they might never find out. This hurts Betty, the seller.

Also, note that other buyers cannot learn about Albert's demand for Betty's camera until after Anne's auction is over. If they could, they might adjust their bidding strategy in Anne's auction, bidding more aggressively if they thought Albert would bid a lot for Betty's camera, and vice versa. This hurts both the buyers and the sellers, as buyers are not able optimally to allocate their demand (i.e., aggressive bids) over the various auctions.

The second difference is that Albert can't adjust his bid for Anne's camera after the fact. Suppose he loses all three auctions; he may then wish he had bid a higher amount for Anne's camera, say $180 (enough to win the auction). But it's too late, since Anne's auction is already over. This hurts both Albert and Anne, since they could each have benefited from trading with each other at $180.

The third difference is that Betty and Caroline's auctions might end at approximately the same time. If this is the case, Albert must choose one or the other auction to participate in, in the event that he loses Anne's auction. There is a reasonable probability that Albert will turn out to have chosen inefficiently, meaning that he and the other seller could have gained by trading with each other.

It is still further useful to discuss here why state-of-the-art multi-object auction designs could not appropriately be used instead of the design of the present invention to overcome the same problems and fulfil the same functions.

State-of-the-art multi-object auctions have been used in many complex economic environments, such as spectrum allocation, procurement, privatizations, and corporate sales. Despite their myriad complexity, there is one simplifying feature these environments share in common—supply and demand are static. Economists sometimes call this the "n bidders in a room" condition. The auction process itself can be dynamic and quite complicated—this is the n bidders competing with each other for the objects being auctioned. But the supply of items auctioned, and the number of bidders allowed to participate, remain stationary.

This is in contrast to Internet marketplaces, and also to the stock market. New buyers and new items for sale arrive constantly. Albert at first bid on the cameras of Anne, Betty and Caroline, but it was when Debby arrived to the marketplace that he submitted a successful bid. It could also have happened that Albert was the high bidder on Caroline's object, but then Donald arrived to the marketplace and outbid him.

Internet auction designs need to be robust to fluctuations in demand and supply. eBay achieves this robustness by implicitly restricting bidders to participating in just one auction at a time. The present invention achieves this in a much more attractive way.

The present invention provides at least five basic innovations from the Internet auction formats currently in the art.
(1) Allowing bidders to submit contingently-binding bids for items. That is, bids that are fully binding unless withdrawn by either direct action of the buyer or via his bid-withdrawal rule.
(2) Allowing sellers to accept attractive bids, and ignore unattractive bids. Sellers are never required to end their auction at a price not attractive to them.
(3) The definition of and algorithms behind bid baskets and bid-withdrawal rules. In tandem, these allow bidders to bid simultaneously on several different versions of an item, without risk of buying more than is wanted. In so doing, several advantages are gained for buyers and sellers.
(4) Requiring auction sellers to post buy prices, and allowing these to be adjustable.
(5) Creating an Internet auction format that ends on a buyer or seller action, not relying on a time limit.

These innovations create at least the following advantages for this auction method:

(1) Lower and Flexible Transaction Times

Transaction times are lowered both on a per-item-demanded basis (i.e. how long does it take to buy one camera on the site) and on a per-item-auctioned basis (i.e. how long does it take to sell camera X on the site). Furthermore, in prior art auction systems, sellers must choose the length of their auctions in advance. An advantage of the method of the invention is that sellers need not specify their auction duration in advance. This gives sellers the flexibility to respond optimally to market conditions.

Illustrative Example:

Suppose Anne wants to sell a pair of tickets to an event taking place on, say, Sunday. She may think that demand for tickets is likely to be highest close to the event, as interested buyers become more and more desperate. Hence, she may choose, if she is forced to in advance, to end her auction close to the event time, say, Friday. By fixing the auction ending time on that Friday, Anne foregoes two sources of potential demand. First, some buyers may have a strong preference to get their tickets early, and may be willing to pay a premium to do so. Second, some buyers may find their tickets from other sources. As a result, Anne may find that demand on Friday is less robust than she anticipated, and regret her choice. She may wish, after the fact, that her auction had ended earlier.

An advantage of the present invention in this regard is that Anne need not decide in advance when she will end her auction. She can open her auction as early as she likes, specifying a buy price high enough such that, if bid, she will not regret selling early. She can adjust her buy price over time as she likes, possibly responding to demand. As buyers submit bids, she can evaluate the revealed level of demand and decide over the course of her auction whether to end her auction early by accepting an attractive bid, or to wait and hope for a better bid. Thus, the auction will last until Friday (or Saturday or Sunday) only if she chooses.

(2) Buyers are More Likely to Get the Item that is Their Best Price-Object Combination Bidders are allowed to bid on multiple close substitute items, at different prices. So if the buyer's favourite camera is A, but he also likes B, this can be reflected in the bid amounts. On standard auction sites it is only possible to bid on one item, so the buyer would probably bid on A. But if competition for A is fierce, then B might be a better price-object fit. By allowing bidders to submit bundles of bids, it is more likely that the auction will allocate items more efficiently. This means that buyers get the item that is best for them, and sellers get better pricing on average, bearing in mind that in the above scenario, seller A would have done fine anyway, but seller B would have suffered.

(3) No "Sniping" (Last Minute Bidding)

On known auction sites, almost all of the serious bidding activity is in the final minutes or even seconds of an auction. This creates enormous frustration for buyers, and probably means that sellers aren't getting the best prices possible. It is also worth noting that sniping is a form of withholding information from the marketplace, and withholding information generally reduces efficiency.

(4) Flexibility for Sellers

If their item isn't attracting attention, sellers can lower the buy price and minimum bid amounts. If an item has time-sensitive demand—like sports tickets, which are probably but not definitely most valuable just a few days before the game—sellers do not need to be strategic over when they start and end their auction. (See the illustrative example above) They need only be strategic over whether they accept an early high bid price, or wait hoping that closer to the time of forecasted maximum demand they will get a higher price. Sellers are never required to end their auction at a price not acceptable to them.

(5) Less Inconvenience for Buyers

Most importantly, bidding on standard auction sites can be inconvenient. A buyer may bid for item A (meanwhile item B's auction ends), loses then bids for item C, then D, then E . . . (all the while wishing he'd won B!). The known auction sites tend to be collectible friendly, but not shopping friendly.

(6) Fun

This auction format will create an enjoyable user experience for buyers and sellers.

Several potential embodiments of the invention can extend the basic format described in relation to the above-mentioned exemplary embodiment, as follows:

(1) Package Bidding

One potential extension is to allow for package bidding. On current Internet auction sites, if a single seller has a bundle of items to sell, in which the items might constitute substitutes or complements for the bidders, the seller must choose her partition of this bundle ex ante. For example, a seller might have four season tickets for a sports team. She must decide whether to sell four tickets per game at a time, or two tickets per game at a time, or four tickets for the whole season, etc. A package bidding technology would allow the seller to post her entire supply, and accept bids for various packages of tickets. This way, the seller is able to discover whether demand is highest for four tickets at a time, or for two tickets at a time (or for one and 3), etc. In the envisioned embodiment, bidders submit offers for one or more packages of tickets. The system would include a sophisticated engine for displaying the bids and calculating current-best and current-dominated offers.

The seller would be required to post buy prices on at least some set of packages that form a partition of the whole bundle. For example, the seller could set a buy price for each set of four tickets of $4x, and, if hesitant to sell tickets in two-ticket lots until certain of the demand, she could set the buy price for sets of two tickets at $2.5x. Bidders could bid on the packages for which buy prices are set, or on any other package. Note that if there are n total items in the bundle, there are $2^n-1$ possible packages of goods. A further extension would allow sellers to preclude certain idiosyncratic bids (e.g. one ticket for game 1, two tickets for game 3, four tickets for game 7), thereby greatly reducing the complexity of the combinatorial problem.

Package bidding would also allow individuals who wish simultaneously to sell a large number of unrelated items to do so in a coherent, organized, and efficient way. For example, an individual might want to sell many items from her apartment before moving, and might want to encourage buyers to buy more than one of her items for sale (e.g. to save on transactions costs, like the inconvenience of arranging pick-up and delivery). Or, a family might want to conduct "our family's attic sale" from a single point of sale. In such an embodiment, the family/seller would be able to "invite" bidders to their sale and would be incentivized to do so by a lower transaction fee if an invited bidder wins. Additionally, the family seller would be able to use a revenue target, such that if at any point in time a collection of bids outstanding exceeds such target, all bids in the collection are accepted simultaneously (barring violation of any bid-withdrawal rules amongst the various bids in the collection).

(2) Multi-Dimensional Bidding

A second potential extension would be to allow multiple-dimensional bidding, i.e to allow bidders to bid along both price and other factors. For example, a bidder could bid "$800, and seller must deliver the tickets to my office Friday". Such a bid, even if at the buy price amount, would not immediately end the auction, because the seller must be allowed to consider the particular transactional idiosyncrasies and whether she is comfortable with them. Furthermore, in a multiple-dimensional bidding environment, there will not be a single bid price, but rather a collection of non-dominated individual bids of which the seller is allowed to accept any one. In the envisioned embodiment, the seller would define the additional dimensions, including also a multi-dimensional buy price (e.g. "$800 and must pick up from my office before Friday"). A further extension would allow bidders to define their own additional dimensions.

(3) Buyer-Generated Listings

A third potential extension would be to allow buyers to generate their own listings, indicating their demand. In the envisioned embodiment of this extension buyers run what in effect are their own procurement auctions. Buyers make a binding offer to prospective sellers in the form of a bid, analogous in function to a seller's buy price, and they set a maximum acceptable seller buy price amount, analogous in function to a seller's minimum bid amount. Sellers "bid" by submitting buy prices (which the buyer may accept at any time) or they may accept the buyer's bid. A further extension would be for the buyer-generated listings simply to serve as encouragement to sellers to post such items, potentially with the generating buyer getting a pre-auction opportunity to bid the buy price.

(4) Supply Baskets and Supply-Withdrawal Rules

A fourth potential extension would be to allow sellers, analogously to buyers, to use supply baskets and supply-withdrawal rules. Supply baskets are defined analogously to bid baskets, as a linked collection of contingently-binding supply. Supply-withdrawal rules are analogous to bid-withdrawal rules. An example where a seller might want to use this technology is when a seller has two of a type of item—e.g. cameras, or pairs of tickets to a game—wants to keep one of them, but doesn't know which one to sell. This way the seller can post both units of supply, with buy prices for each unit, but be protected against selling more than he wants to, by setting a supply-withdrawal rule of "withdraw my other item as soon as either item is sold".

Referring to FIG. 1 of the drawings, at the centre of the auction system is a Database (1), which holds information regarding items for sale, traders, bids, bid-baskets, completed transactions, etc. Both Users (2) and software Agents (3) may interact with the database. In the preferred embodiment, users interact by means of a website on the World Wide Web, and agents interact by means of TCP/IP. Examples of software agents include listing managers (e.g. eBay's Turbo Lister) and program trading algorithms. The Auction System (4) contains the various engines and algorithms needed to implement the auctions, using information in the Database. A System Clock (6) connects to both the Auction System and the Database, for use in determining the precise timing of bids and accepts. The System Clock resolves disputes between e.g. two users who perform the same action at a nearly-identical time. The Auction System, using information from the Database, can instruct the Notification Server (5) to send reports on the auctions to Users and Agents, e.g. "you've won".

Referring to FIG. 2 of the drawings, an object structure which can be used in an auction system according to an exemplary embodiment of the invention will now be described.

A Trader object contains personal characteristics, active bid baskets, active items for sale, transaction history, active contractual agreements, and reputation and feedback information. Personal characteristics includes information such as user identification, name, address, identity confirmation (e.g. a credit card), and public personal information (information the Trader is willing to make public to the other Traders). Active bid baskets and active items for sale represent the Trader's current trading activity, as buyer and seller, respectively. Transaction_History contains inactive bid baskets and inactive items for sale. Active_Contractual_Agreements represents the trades the Trader is currently in the process of consummating, and the name emphasizes that such trades are binding on the two parties. Reputation and feedback information contains other Traders' comments on this Trader's performance and reliability.

An Item_For_Sale object contains a reference to the Trader selling the object, item characteristics, bidding information, and bid history. Item characteristics includes seller-defined information like the item's name, description, picture, item categories, and transaction information (e.g. shipping costs). Bidding information includes all of the information relevant to the current bidding, such as the minimum bid, the current high bid (bid price), and the buy price. It also contains the item's status, which can take on the values {For_Sale, Sold, Withdrawn}, a reference to the Trader who is the current high bidder, or to the winning bidder if the object has been sold, in which case it also contains a final price. Bidding history includes information on all previous bids for the object, including the highest offer, the number of offers, changes in the seller's pricing parameters, and the time the item was posted.

A Bid object contains a reference to the Trader making the bid, a reference to the Item_For-Sale for which the bid is placed, the bid amount, and the bid status. Bid status can take on the following values: {Accepted, Valid_High, Valid_Not_High, Invalid, Withdrawn, Not_Yet_Submitted, Held_No_Bid}.

A Bid Basket object contains a reference to the Trader placing the bids, the name of the bid basket, the bid basket's bid-withdrawal rule, the bid basket's status, and the collection of bids the Trader has placed in the bid basket. The bid withdrawal rule in the preferred embodiments consists of a pair (k, $m) $\in Z^+ \times R^+$ or a triple (k, $m,t) $\in Z^+ \times R^+ \times Z^+$, with k the number of items demanded, $m the bid basket budget, and t the time limit on the bid basket. The bid basket's status is a pair (p,$s) $\in Z^+ \times R^+$, with p the number of items purchased so far, and $s the amount spent on the items purchased.

Figure 3:
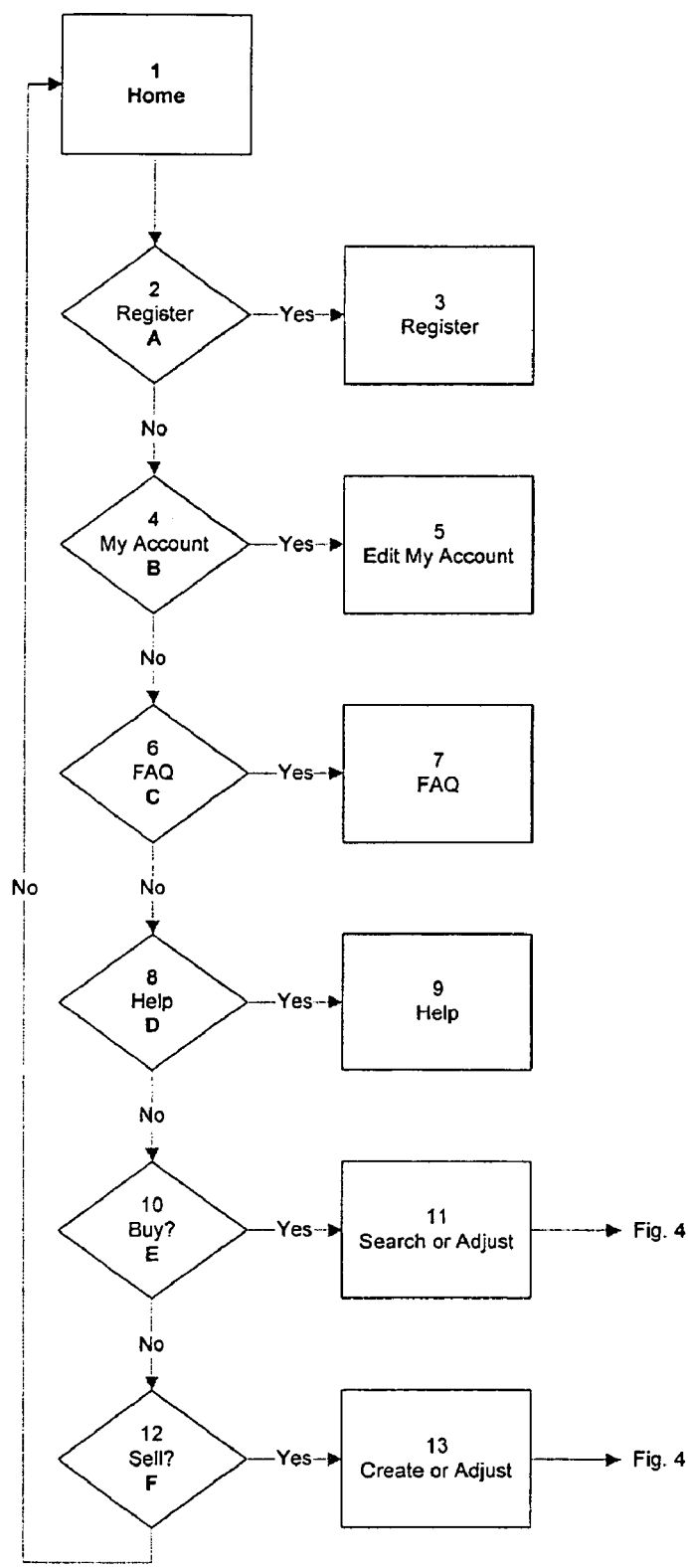
FIG. 3 is a schematic flow diagram illustrating an overview of an auction site provided in accordance with an exemplary embodiment of the present invention.

Referring now to FIG. 3, users reach Home (1) exogenously. In the preferred embodiment on the World Wide Web, users reach Home by means of typing a URL into their web browser, or by finding the site via a search engine or some similar method. In other potential embodiments, they will reach Home in different ways.

From Home, users can choose one of the basic site activities, including but not limited to Register, My Account, FAQ, Help, Buy, and Sell (A-F). Register (3), Edit My Account (5), FAQ (7) and Help (9) are not detailed in this document, and are substantially similar to other offerings. Note that each of these activities would return the user to Home upon completion. Search or Adjust (11) and Create or Adjust (13) are the main activities of buyers and sellers, respectively.

Figure 4:
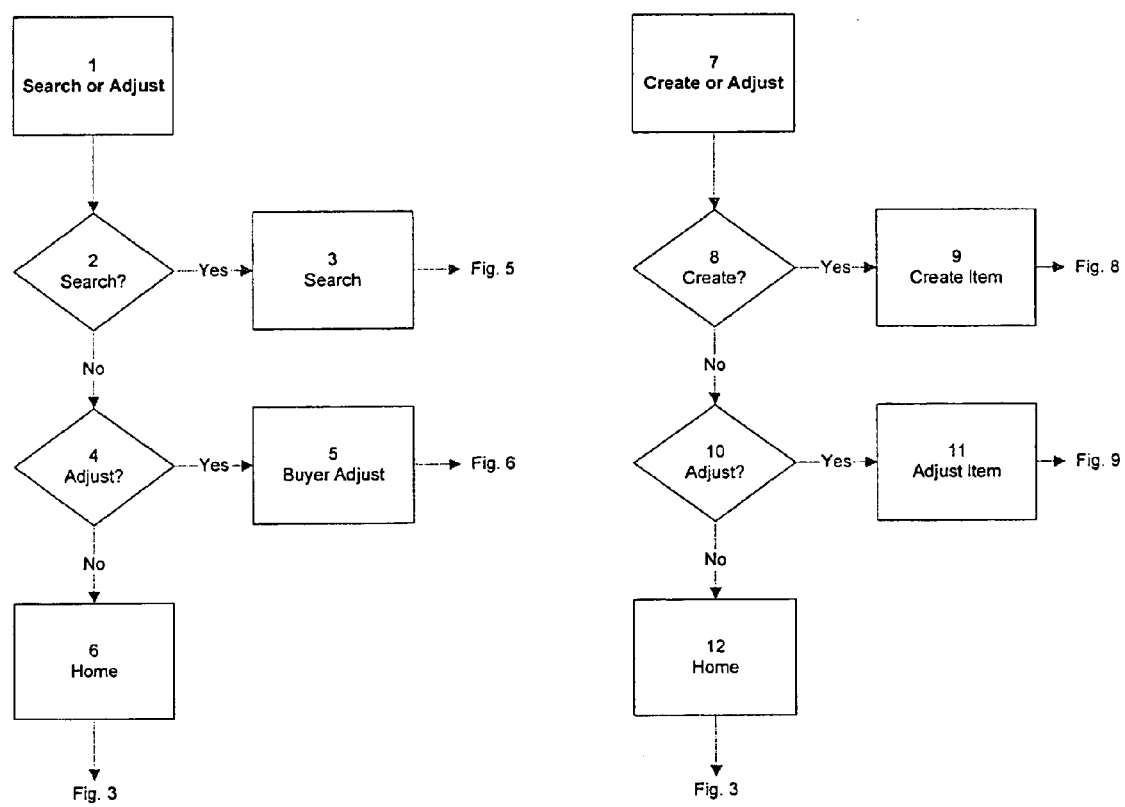
FIG. 4 is a schematic flow diagram illustrating the basic actions of buyers and sellers in a system according to an exemplary embodiment of the present invention.

Referring to FIG. 4 of the drawings, Search or Adjust (1) and Create or Adjust (7) are the main activities of buyers and sellers, respectively. From (1) or (7) users make a simple binary decision or else go to Home (6). Users reach (1) and (7) from Home (see FIG. 3) and from other various other points in the methods, whenever they can be identified as currently acting as a buyer (in which case they are frequently sent to (1)) or a seller (similarly, sent to (7)).

Figure 5:
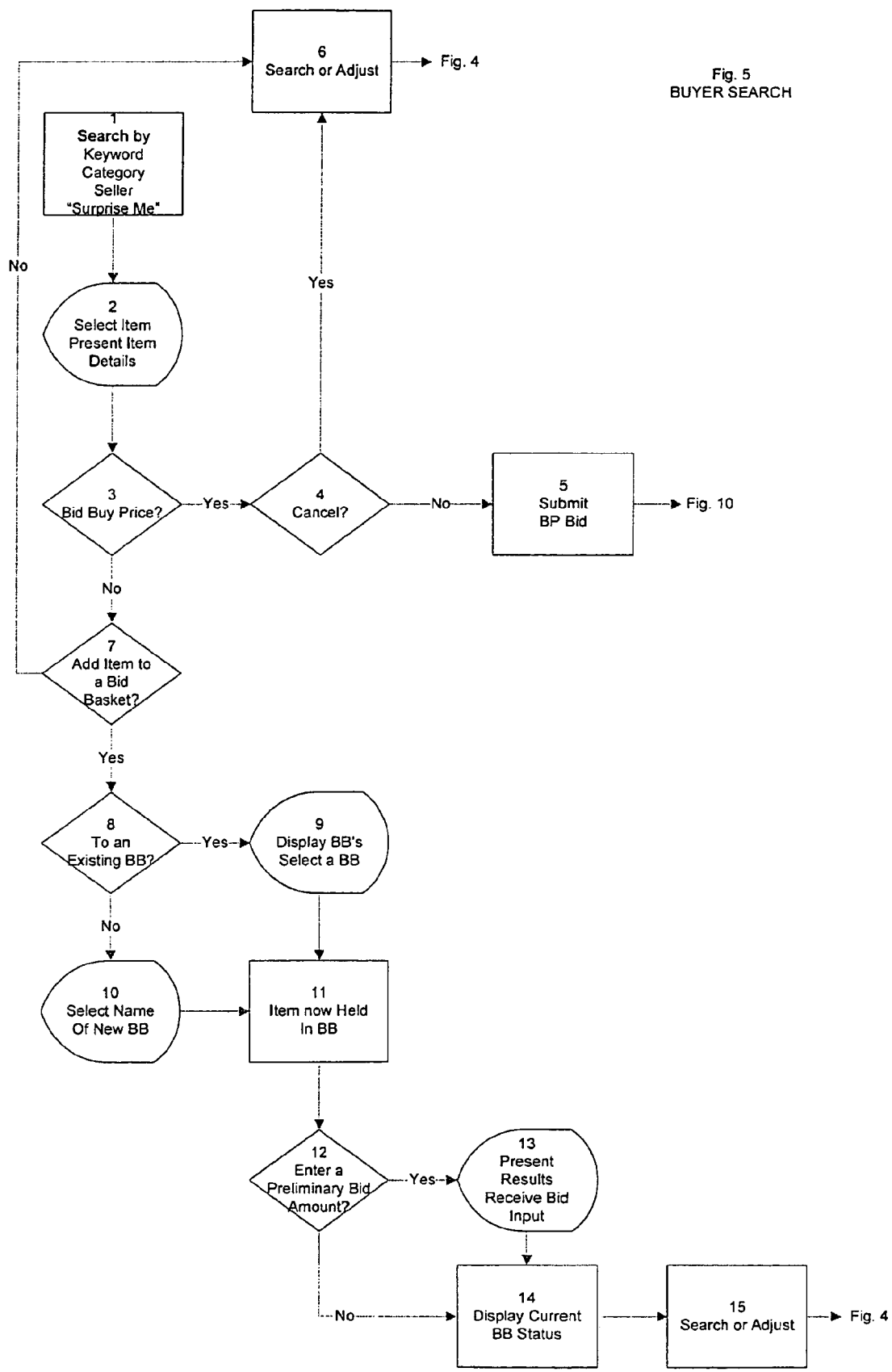
FIG. 5 is a schematic flow diagram illustrating the principal steps involved in a buyer search (and the addition of items to bid baskets) using a system according to an exemplary embodiment of the present invention.

Referring now additionally to FIG. 5, Buyer Search (1) is a basic buyer action (FIG. 4). Buyers search in any of a number of different ways, including but not limited to by Keyword, Category, Seller, or "Surprise Me" (in which case they are directed to an item at random). While Searching (1) they can at any time Select Item (2) in which the item's details are presented to the buyer. The buyer can always opt to immediately Bid Buy Price (3, 5, see FIG. 10) if he wants to win the item immediately at the buy price. Otherwise, the buyer adds the item to an existing bid basket (9) or to a new bid basket (10) in which case he provides a name for the new bid basket. The item is now Held in Bid Basket (11) with bid status Held_No_Bid. The buyer can opt to enter a preliminary bid amount (12, 13) in which case the system checks that the bid is valid (i.e. a whole-cent amount greater than or equal to the minimum bid and less than the buy price), and sets the bid's status to Not_Yet_Submitted. The system then displays the current status of the bid basket (14) and asks the buyer whether he wants to Search or Adjust (15, see FIG. 4).

Note that if the buyer chooses Bid Buy Price (3) but then decides to Cancel (4), he is returned to Search or Adjust (6). Similar Cancel nodes are omitted throughout the rest of the figures, for reasons of space and clarity.

Figure 6:
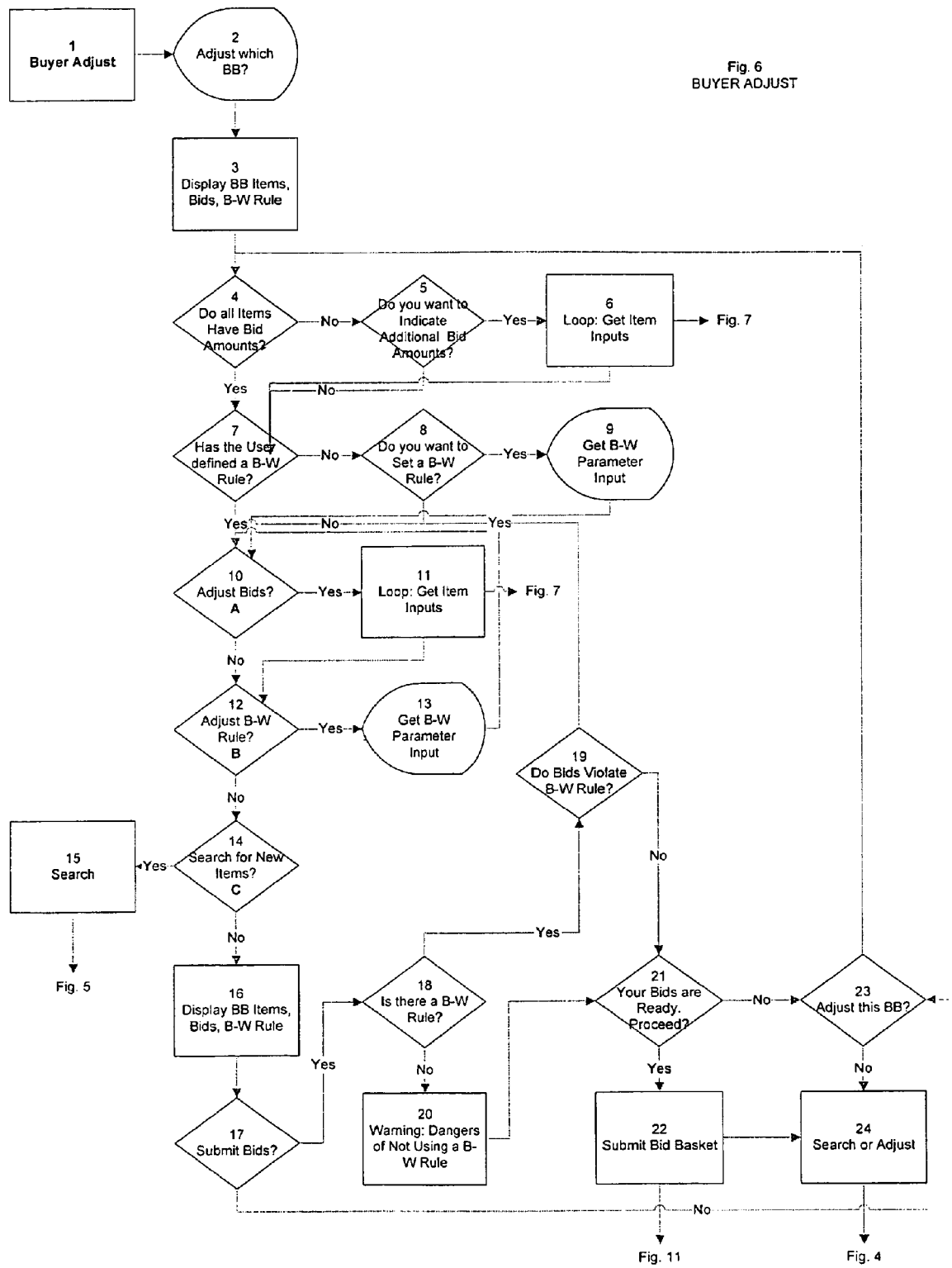
FIG. 6 is a schematic flow diagram illustrating the principal steps by which a buyer can adjust and submit their bid basket(s) in a system according to an exemplary embodiment of the present invention.

Referring to FIG. 6, Buyer Adjust (1) is a basic buyer action (FIG. 4). It is the method by which buyers adjust and submit their bid baskets, and is at the heart of the system. Buyers select which bid basket to adjust (2) and are reminded of its details (3). If any of the items has status Held_No_Bid (4) and the buyer is asked if he would like to indicate additional bid amounts (5), in which case he does so via a loop through each item in the basket (6, see FIG. 7). If the user has not defined a bid-withdrawal rule yet (7), the buyer is asked if he would like to (8) and enters the bid-withdrawal rule inputs (9).

Following this initial check, the buyer is given the option of adjusting his bids (10), or bid-withdrawal rule (12). Note that if he does choose to adjust his bid-withdrawal rule (13) he is re-asked if he would like to adjust his bids. The buyer is given the option of searching for new items (14, 15) which he could then place in this bid basket or some other one. If the buyer does not want to search for more items to add to the bid basket at this time, the details of the basket are displayed (16) and the buyer is asked to confirm that he would like to submit the bids (17).

The system checks if the buyer has established a bid-withdrawal rule (18). If he has, the system checks whether the bids violate the bid-withdrawal rule (19, FIG. 12). If the buyer has reached his quantity ceiling (i.e. $p \geq k$) or if some bid would violate his budget constraint if accepted by the seller (i.e. \$s+"bid">\$m for some bid) the system notifies him accordingly and offers the chance to adjust his bids and bid-withdrawal rule (10, 12). If not, the buyer is asked to confirm that he would like to submit his bid (21), and if so the system Submits Bid Basket (22, FIG. 11) and the buyer returns to Search or Adjust (24, FIG. 4).

Figure 13:
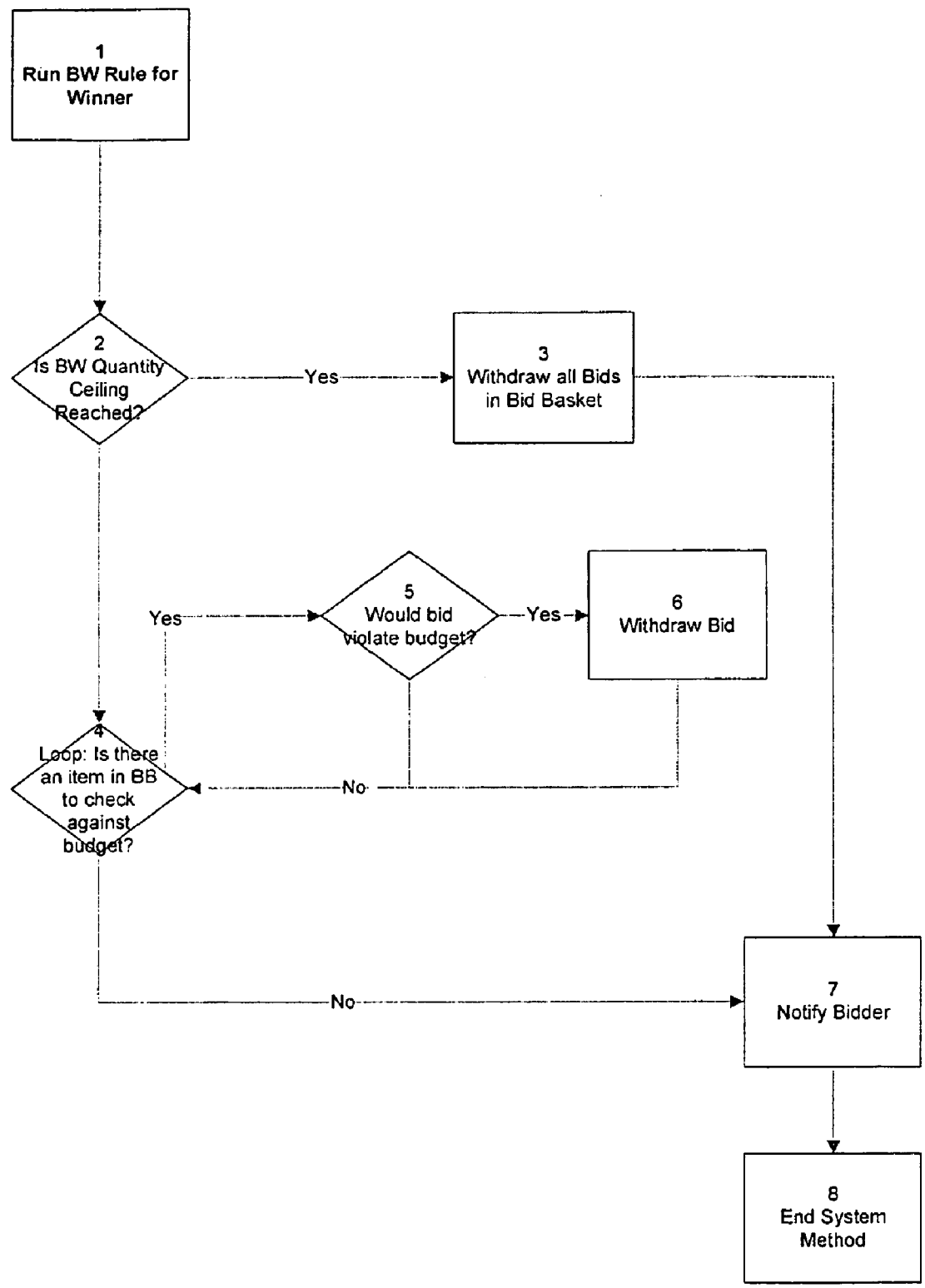
FIG. 13 is a schematic flow diagram illustrating the principal steps in running a bid withdrawal rule for the winner of an auction in a system according to an exemplary embodiment of the present invention.

The Buyer Loop (1) Get Bid Basket Item Inputs is called from FIG. 6, (6) and (11). The loop goes through each item in the bid basket. So long as there are items remaining in the loop (2) the buyer chooses whether to Bid the Buy Price, Submit a Bid, Hold for Later, or Delete the Item (A-D). Submit BP Bid (5) calls the method in FIG. 10; note that if the bidder submits such a bid, the method Run BW Rule for Winner is called (FIG. 10 (10); FIG. 13) which potentially withdraws other bids from the basket. Thus, the loop cannot induce the buyer accidentally to violate his bid-withdrawal rule. If the buyer Submits a Bid (6, 7) the system checks that the input is valid (FIG. 5 (13)). Hold Item for Later (9) sets the bid's status to Held_No_Bid. Delete Item (11) sets the bid's status to Withdrawn.

Figure 8:
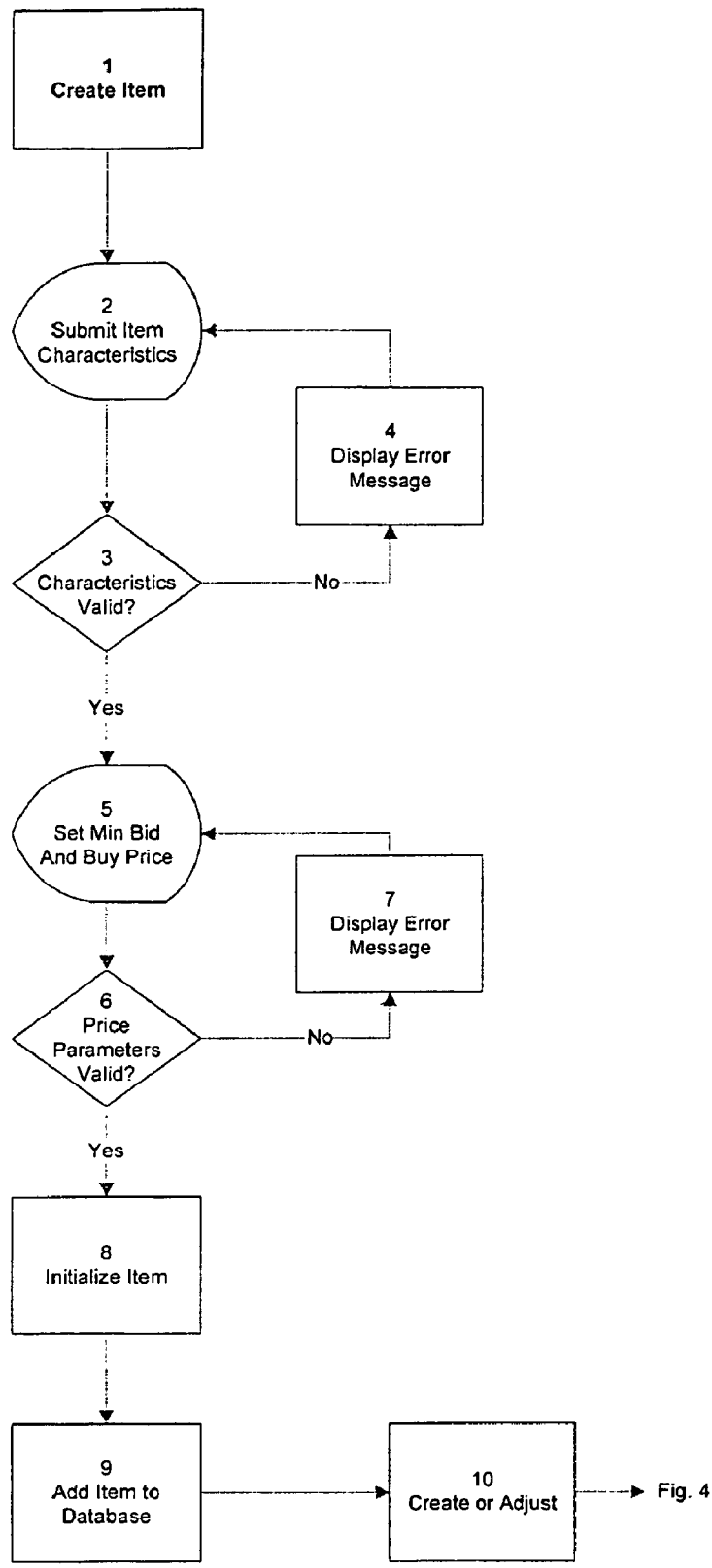
FIG. 8 is a schematic flow diagram illustrating the principal steps by which a seller can create an item for sale in a system according to an exemplary embodiment of the present invention.

Referring to FIG. 8, Create Item (1) is basic seller action (FIG. 4). The seller is asked to define item characteristics such as name, description, etc. (2, FIG. 2, Description of FIG. 2). If the characteristics are input properly (3), the seller indicates a minimum bid and buy price (5). The only requirement for the minimum bid (\$x) and buy price (\$z) is that they each be whole-cent amounts with $x \leq z$. If these requirements are met (6), the system initializes the item (8). This includes setting the time the item is posted using the System Clock (FIG. 1, (6)), setting the item's status to For_Sale, and initializing various other parameters of the item to 0 or null. The item is then added to the database (9, FIG. 1, (1)) and the seller is asked to Create or Adjust (10).

Figure 9:
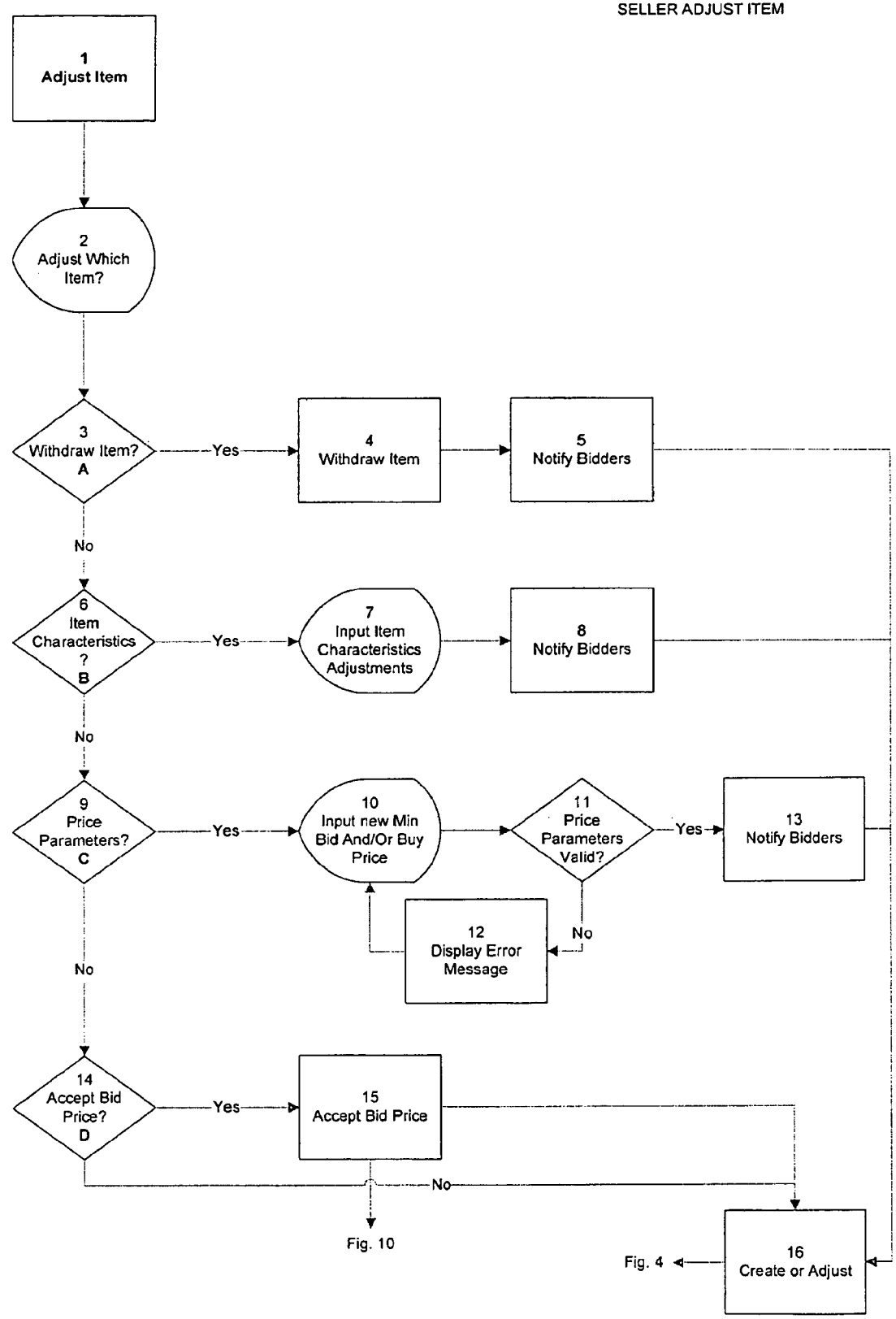
FIG. 9 is a schematic flow diagram illustrating the methodology by which a seller can adjust an item for sale in a system according to an exemplary embodiment of the present invention.

Referring to FIG. 9, Adjust Item (1) is a basic seller action (FIG. 4). The seller chooses which item to adjust (2), and then whether to withdraw the item, alter its characteristics, change its price parameters, or accept the bid price (A-D). If the seller withdraws the item (4) or alters any of its characteristics (7) bidders are notified (5, 8). Note that if a seller materially alters an item description and then accepts the high bid, the high bidder can renege. If the seller inputs new price parameters (10) the system checks that the price parameters are valid (11) by looking at both: is the minimum bid below the buy price? (i.e. $x \leq z$) and is the buy price greater than the bid price \$y i.e. $z > y$). Note that if the seller wishes to set the buy price at or lower than the highest bid, it is better for him instead to accept the bid price (14, 15). Accept bid price (15) calls the method of FIG. 10. After he adjusts the current item, the seller is asked Create or Adjust (16). If the seller performs an action A-D the system checks for the validity of the action (e.g. if in the prior moment a bidder has acted in a way conflicting with the seller's action). This is omitted from the drawings for clarity of presentation.

Figure 10:
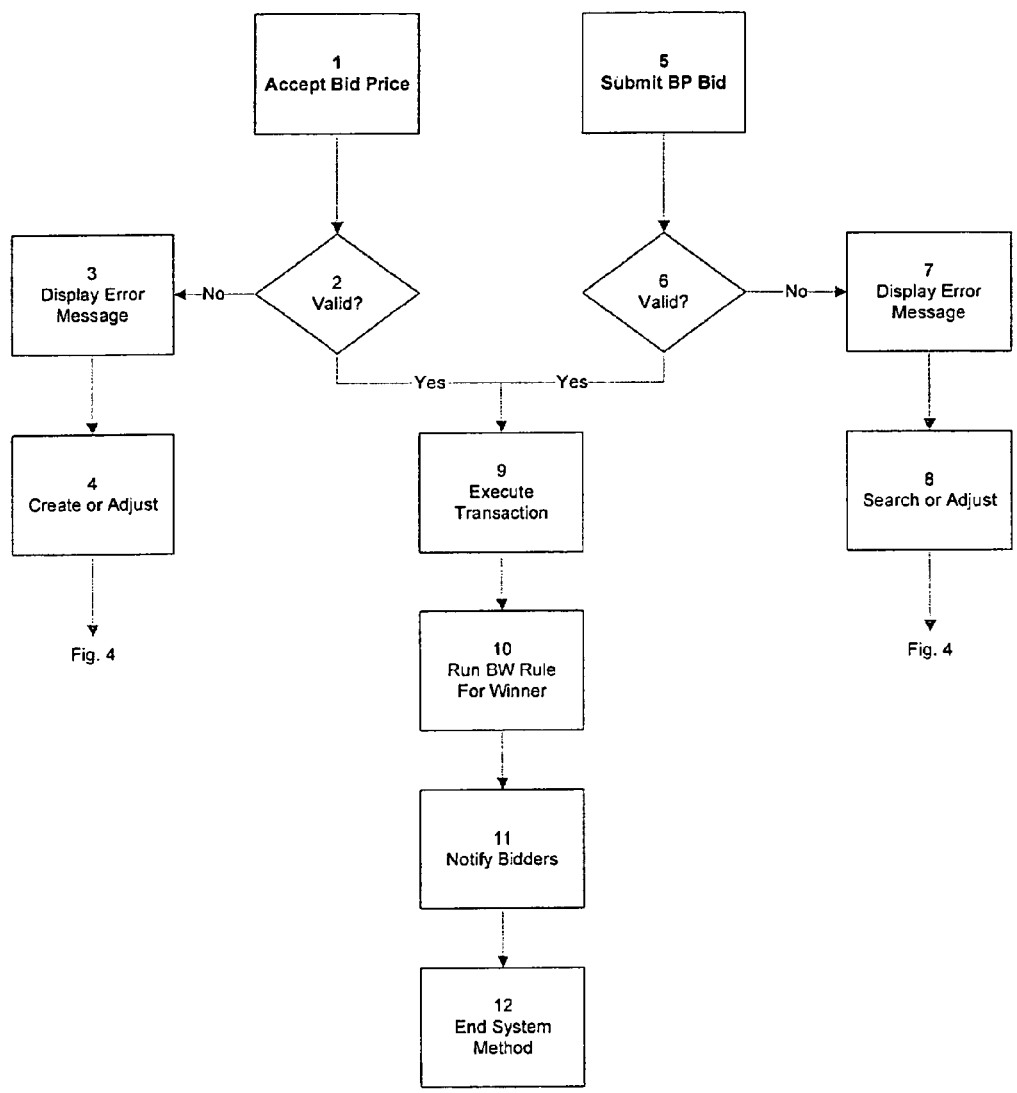
FIG. 10 is a schematic flow diagram illustrating the principal steps in executing a transaction as a result of a bid being accepted by the seller or a buyer bidding the buy price for an item in a system according to an exemplary embodiment of the present invention.

Referring to FIG. 10 of the drawings, if the seller Accepts Bid Price (1, FIG. 9 (15)) the system checks if the acceptance is valid (2; e.g. in the prior moment has a different bidder bid the buy price) and if so Executes the Transaction (9). Similarly if a buyer Submits BP Bid (5, FIG. 5 (5), FIG. 7 (5)). Executing the Transaction consists of setting the item's status to Sold, setting the winning bidder and bid accordingly, and updating the winner's bid-withdrawal status pair: (p,\$s)→(p+1, \$s+"bid"). Then, the system Runs the Bid-Withdrawal Rule for the Winner (10, FIG. 13), and notifies all bidders of the outcome (11).

Figure 11:
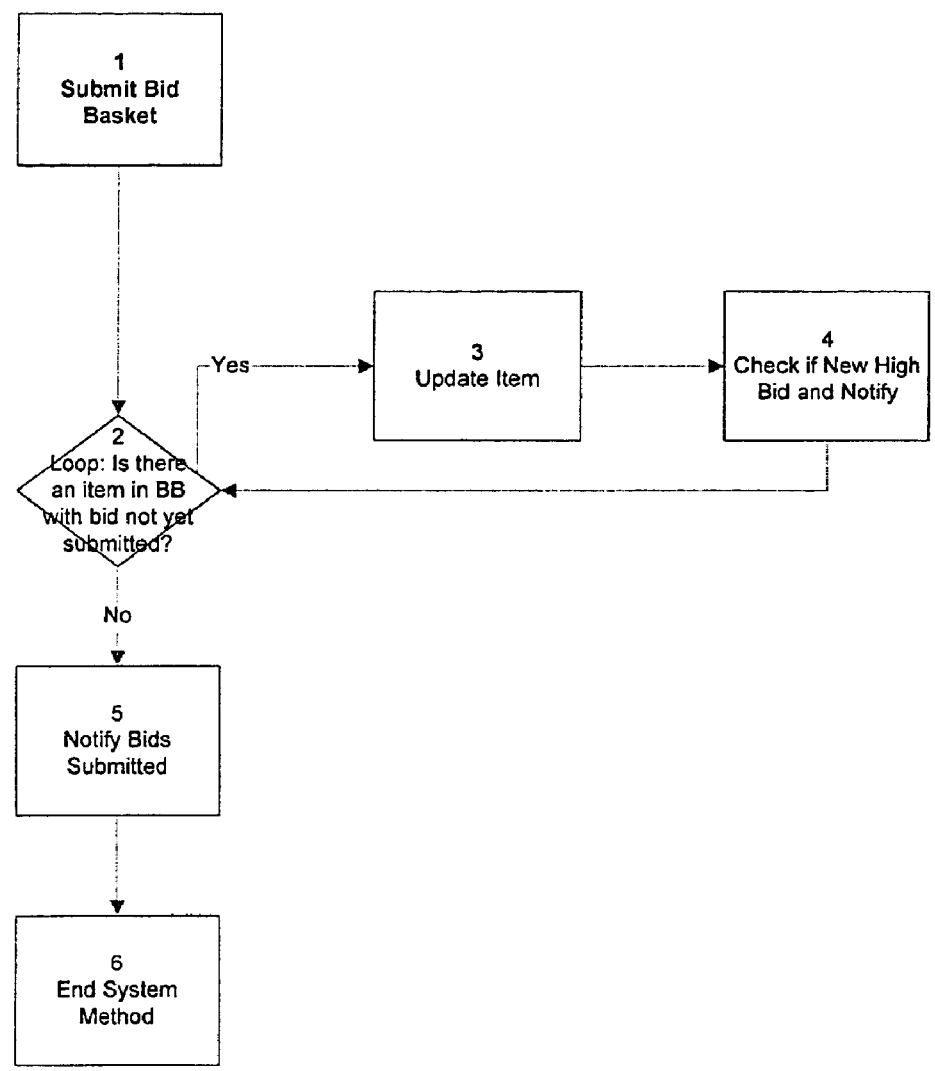
FIG. 11 is a schematic flow diagram illustrating the principal steps taken in response to the submission of a bid basket in a system according to an exemplary embodiment of the present invention.

Referring to FIG. 11, when a bidder submits his bid basket (1, FIG. 6 (22)), the system loops (2) through all of the items in his bid basket, checking each for status Not_Yet_Submitted. Each time a bid has this status, it is submitted by updating the item (3, FIG. 1) with the bid, and then determining the status of the bid (4) and, if the bid is the new high bid, notifying the former high bidder. The bidder is notified (5) when all of his bids are submitted, and is informed of the status.

Figure 12:
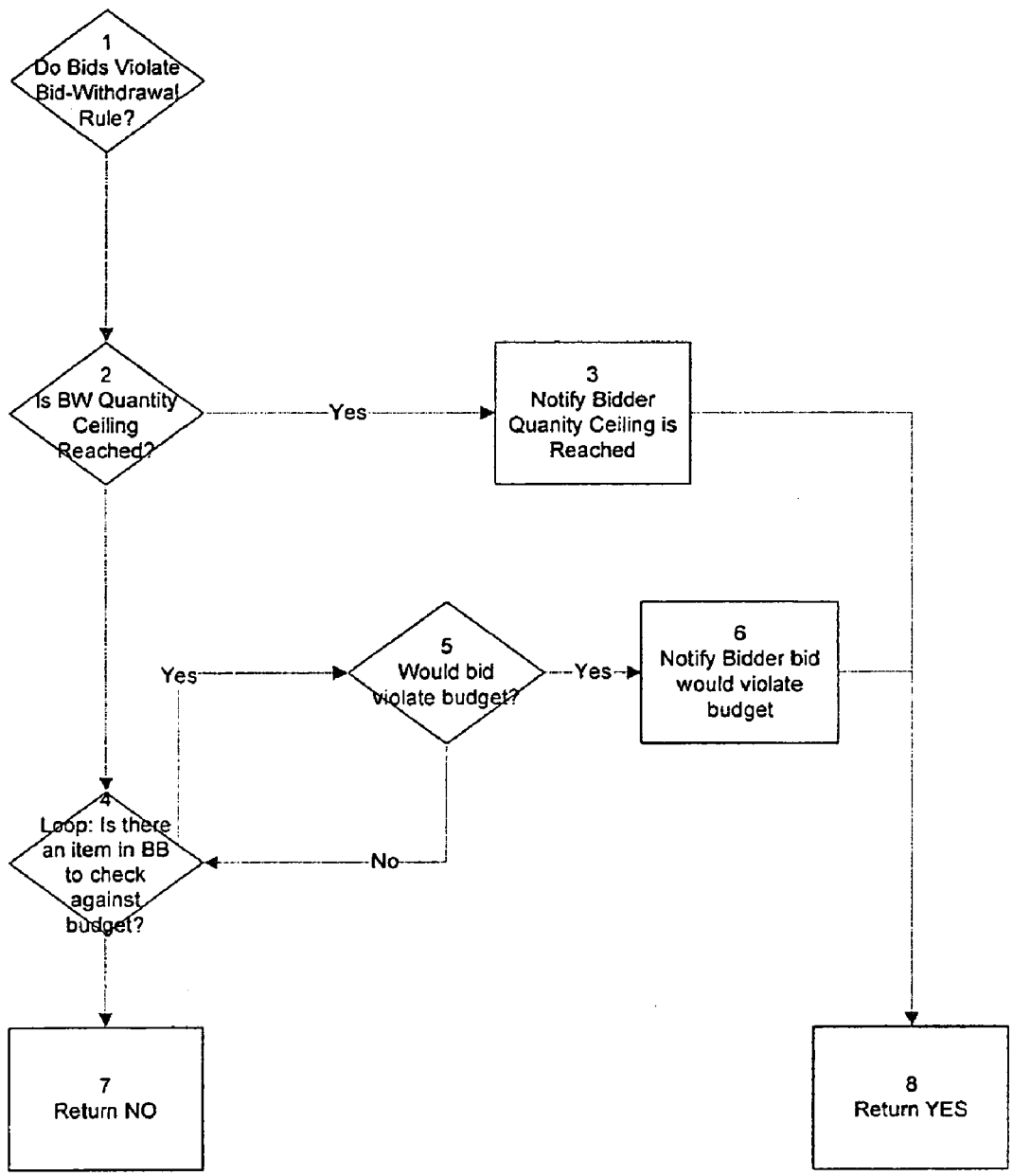
FIG. 12 is a schematic flow diagram illustrating the principal steps in a methodology for checking whether submitted bids violate bid withdrawal rules in a system according to an exemplary embodiment of the present invention.

Referring additionally to FIG. 12, the question Do Bids Violate Bid-Withdrawal Rule (1) is called from FIG. 6 (19). The system checks if the bid-withdrawal rule's quantity ceiling has been reached (2), ie. If $p \geq k$. If so, the bidder is notified (3) and the method returns Yes (8). If the quantity ceiling has not been reached, the system checks via a loop (4) if any item in the bid basket would violate the budget constraint if accepted by the seller (5) i.e. it checks if \$s+"bid">\$m for some bid. If so, the bidder is notified (6) and the method returns Yes (8). If the loop finished without any bid violating the budget constraint, the method returns No (7).

Note that the bid-withdrawal rule will only be violated in this method for bids that have not yet been submitted. Consequently, there is no need within this method to actually withdraw any bids. FIG. 13 deals with the situation of a bidder actually winning an item, altering his pair (p, \$s) and thus potentially requiring the actual withdrawal of bids.

Referring to FIG. 13, the system runs the bid-withdrawal rule for the winning bidder (1) using his updated bid-withdrawal status pair (p, \$s) (FIG. 10 (9)). If the quantity ceiling is reached, i.e. if p=k, all bids in the bid basket are withdrawn (3) and the bidder is notified (7). If not, the system checks each bid by a loop (4) for whether, if accepted, it would violate the budget. Each bid that would violate the budget (5) is withdrawn (6). The bidder is then notified as to which of his bids have been withdrawn (7).

Note that p>k is not a possible state in this method; the bids could never have been submitted in the first place were this possible, i.e. were $p \geq k$ prior to this item being won (FIG. 6, 12). This is in contrast to FIG. 12 where p>k is possible because the bids have not yet been submitted, i.e. they are still hypothetical.

The four above-described extensions of the preferred embodiment can be implemented via simple extensions of the apparatus described for the preferred embodiment.

The Package Bidding extension is implemented by the following steps. Referring to FIG. 2, an Object Item_For_Sale is now defined as a bundle of objects. For instance, the bundle might be four tickets to an event. Bidding Information includes a buy price not just for the whole bundle, but also, at the seller's option, for various subsets of the bundle.

Figure 7:
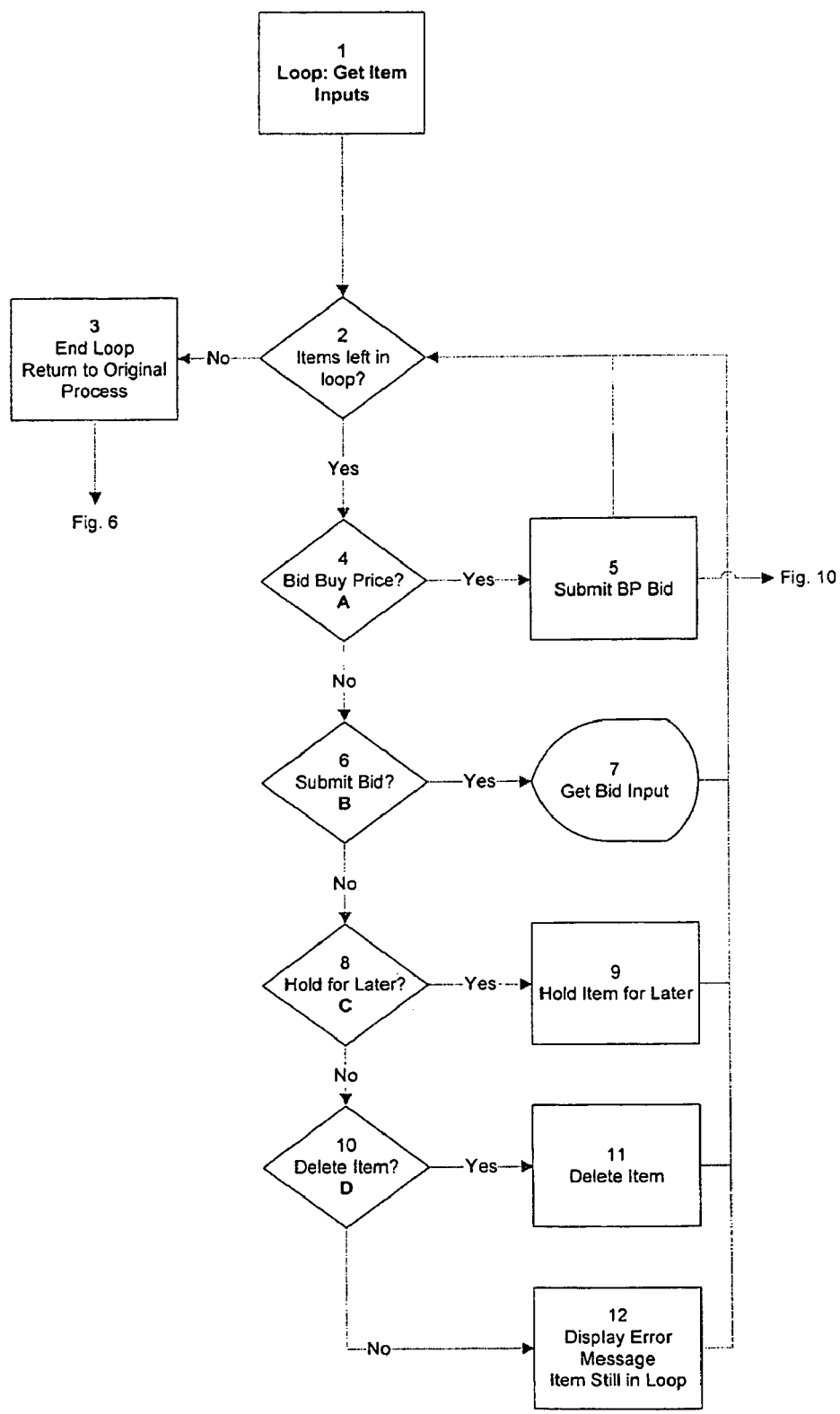
FIG. 7 is a schematic flow diagram illustrating a buyer loop in a system according to an exemplary embodiment of the present invention.

When buyers bid (FIG. 5, 12-13; FIG. 7, 7), they may bid either on the whole bundle or on some subset of it. For instance, the buyer may bid on four tickets or may bid on two (particular) tickets. Referring to FIG. 5, when buyers Select Item (2), they select a package of items, consisting of one or more mutually disjoint components of a seller's supply bundle. They are offered the option to Bid the Buy Price (3) only if the seller has defined a buy price on the buyer's particular package. Note that a buyer who bids for a package containing two particular tickets, has not automatically bid for a package containing the two other tickets. If the buyer, as is likely, thinks that all four tickets are equally valuable, and demands two, he may submit bids for multiple pairs of tickets, and specify an appropriate bid-withdrawal rule. Note also that a bidder for four tickets may add a bid for one or more subsets of four tickets to his bid basket (if he would be satisfied with winning fewer than four tickets), and specify an appropriate bid-withdrawal rule.

Referring to FIG. 8, when sellers create a new listing, they do so for a bundle, setting minimum bids and buy prices (5) both for the bundle and, optionally, for various subsets.

Referring to FIG. 9, sellers may simultaneously accept bids for one or more mutually disjoint subsets of their package (14, 15).

Referring to FIG. 10, when either a seller accepts bids or a buyer bids the buy price for some partial subset of the package, Executing the Transaction (9) now includes updating the seller's bundle to exclude the sold portions for the ongoing auctions.

The Multi-Dimensional Bidding extension is implemented by the following steps. Referring to FIG. 2, an Item_For_Sale object now contains space for the seller's definition of additional dimension(s) along which buyers can submit bids. For example, bids might consist of prices and "Details of When You (Buyer) Can Pick Up the Item". The seller's buy price in Bidding_Information consists of both a monetary amount and a textual description of the seller's minimum acceptable terms with respect to the additional dimension(s). A Bid object includes both a numerical bid amount and a (possibly empty) textual string containing the buyer's response along the seller's additional dimension(s).

When buyers bid on an item (FIG. 5, 12-13; FIG. 7, 7) for which the seller has indicated an additional bidding dimension(s), they may indicate either just a monetary amount or both a monetary amount and textual information. Referring to FIG. 5, buyers may Bid the Buy Price (3) by bidding the appropriate amount and indicating to the system their binding acceptance of the seller's minimum acceptable terms with respect to the additional dimension(s).

Sellers in multi-dimensional auctions may accept any bid they like, with the exception that of bids that have no additional information other than a bid amount, they may only accept the highest bid. Referring to FIG. 9, when a seller Adjusts her item (2), she will be displayed its current bids, including both monetary and additional characteristics, in descending order of monetary bid amount. She may Accept (14, 15) bids in the manner just described.

The Buyer-Generated Listings extension is implemented by the following steps. Referring to FIG. 8, in addition to sellers, buyers may Create (1) items. Buyers submit item characteristics (2), including a name, description, etc., which precisely identifies their requirements. Buyers make a binding offer to prospective sellers in the form of a bid, analogous in function to a seller's buy price (5) and they set a maximum acceptable seller buy price amount, analogous in function to a seller's minimum bid amount. Sellers may search for the buyer's listing and submit offers (buy prices) that are less than or equal to the buyers maximum acceptable seller amount (analogously to FIG. 5-6). The buyer may accept the lowest-priced of these offers by bidding its buy price. The auction ends (analogously to FIG. 10) when either a seller accepts the buyer's offer (bid) or the buyer accepts the lowest seller's offer (buy price).

Referring to FIG. 2, the only necessary changes in the object structure to implement Buyer-Generated Listings are that Item_For_Sale is an Item To Buy associated with a Buyer, and a Bid is now an Offer associated with a Seller.

The Supply-Withdrawal Rule extension is implemented by the following steps. Referring to FIG. 2, a new Object structure defined analogously to a Bid_Basket called a Supply_Basket consists of a name, a Trader Seller, a Supply_Withdrawal_Rule, a Supply Basket_Status indicator, and a set of Supply.

Referring to FIG. 8, when a Seller Creates (1) an item, she may do so as part of a supply basket. In a process analogous to FIG. 5 (7-11), she may add the item to an existing supply basket or define and name a new one. If she defines a new supply basket, then in a process analogous to FIG. 6 (9), she may define a supply-withdrawal rule.

Note that unlike in the case of bid baskets, supply baskets are always internally consistent in the sense of FIG. 12. That is, so long as the seller sets a quantity sold ceiling and revenue target each greater than zero, it is impossible that at first initialization either the quantity ceiling is reached or some item would violate the budget.

Whenever one of the items in the seller's supply basket is sold, either by the seller's accepting the bid price or by a buyer bidding the seller's buy price, the system runs the seller's supply-withdrawal rule. This is defined analogously to FIG. 13.

The following is a (non-exhaustive) list of the types of items for which the present invention is particularly well suited:

(1) Consumer electronics (e.g. digital cameras—both new and used).
(2) Used consumer durables, including clothing, dry goods, bedding, sporting goods etc.
(3) Event tickets (sports, concerts, etc). The heterogeneity arises from the difference in seat locations, and potentially also the date, e.g. if a band is performing on multiple nights.
(4) Bulky items, with local and potentially time-sensitive demand. For example, a person selling her mattress might want to sell it on the precise day that she moves or on the day her new one arrives.
(5) Items with low-salvage value and localized demand. For example, the trading communities that arise on college campuses, in items like futons, desk lamps, old couches, etc.
(6) Used textbooks. Again, local trading communities often arise on college campuses but distance trading is not prohibitively expensive. The heterogeneity, within a particular book title, arises from the condition of the book, the edition, and the location of the seller.

(7) Real-estate rentals. This includes both full-time rentals, and partial usage, e.g. usage of an apartment for several months over the summer. If the type of usage allowed is flexible (e.g. in a Bed & Breakfast establishment, the owner is essentially indifferent between one occupant staying two nights and two occupants staying one night each) package bidding would be especially useful. In principle, the method could be applied to the ownership market as well, but that market, being higher stakes and less fluid, is not as ideal a fit.

(8) Financial securities. Advantage may be gained relative to traditional market architectures when bidders are budget-constrained and the securities are heterogeneous. For example, in the case of the complex optimization problem described above of the buyer who desires shares of Microsoft or Intel but not both. A particularly attractive example is the fixed income market because many of the products are very close substitutes (e.g. different maturities of an otherwise identical debt instrument).

(9) Business-to-business exchange items. The method may be used to advantage when there are many suppliers and many purchasers, and there is heterogeneity in the product traded. In such an environment, a hybrid between a conventional stock exchange double auction market and the P2P preferred embodiment discussed herein might be viable. In the hybrid, as in a stock exchange, the intermediary would play a confirmatory role (e.g. confirms that seller A and seller B are selling the same product) but, as in the P2P embodiment, buyers and sellers would be allowed to create new menu items (e.g. buyer A decides to create the menu items "blue paperclips" and "yellow paperclips" when before the only item was "paperclips"). This hybrid is not viable in pure P2P because confirmatory intermediation would be prohibitively expensive.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. Computer-implemented apparatus for conducting an automated auction in respect of one of a plurality of heterogeneous items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software performing the steps of:

a) entering by or on behalf of a plurality of sellers, via respective entry terminals, heterogeneous items to be offered for sale in respective auctions, together with a seller-defined buy price in respect of each heterogeneous item;

b) posting by or on behalf of a plurality of buyers, via respective entry terminals, contingently-binding bids associated with said heterogeneous items, said contingently-binding bids of each buyer being binding unless withdrawn in response to an acceptance of another of said contingently-binding bids of said buyer for a different one of said heterogeneous items; and a) continuing an auction in respect of one of the heterogeneous items until a buyer posts a bid equal to the buy price thereof, or the seller associated with said heterogeneous item accepts a contingently-binding bid posted by a buyer in respect thereof, or the seller associated with said heterogeneous item withdraws said heterogeneous item from sale.

2. Apparatus according to claim 1, wherein said contingently-binding bids posted by or on behalf of said buyers have associated therewith respective bid-withdrawal rules defining circumstances in which respective contingently-binding bids are to be withdrawn.

3. Apparatus according to claim 2, wherein said bid-withdrawal rules are user-definable.

4. Apparatus according to claim 2, wherein said bid-withdrawal rules are variable.

5. Apparatus according to claim 1, arranged and configured to enable a seller to enter a plurality of items to be offered to sale in the form of a bundle, and to enable a buyer to post one or more contingently-binding bids in respect of the whole or selected portions of said bundle.

6. Apparatus according to claim 1, further arranged and configured to enable a buyer to post a contingently-binding bid in respect of a heterogeneous item which includes an offer price and one or more other conditions of said offer price.

7. Apparatus according to claim 1, further arranged and configured to enable buyers to enter, via said entry terminals, items required for procurement.

8. Apparatus according to claim 1, further arranged and configured to enable a seller to enter an item for sale together with a supply-withdrawal rule defining circumstances in which said item is to be withdrawn from sale.

9. Apparatus according to claim 1, wherein said contingently-binding bids must be less than or equal to said buy price.

10. Apparatus according to claim 1, further arranged and configured to enable a minimum bid price, less than said buy price, to be defined in respect of an item for sale, wherein allowable contingently-binding bids posted by or on behalf of said buyers must be between said minimum bid price and said buy price inclusive.

11. A computer-implemented method for conducting an automated auction in respect of one of a plurality of heterogeneous items for sale in a system including a plurality of entry terminals operable by respective buyers and sellers, a database containing information relating to said buyers and sellers and items for sale via an auction, and a processor, wherein said database is communicably coupled to said entry terminals, the method being for conducting said automated auction using said information contained in said database and for facilitating a transaction between said a buyer and a seller as a result of said auction, and comprising:

a) entering by or on behalf of a plurality of sellers, via respective entry terminals, heterogeneous items to be offered for sale in respective auctions, together with a seller-defined buy price in respect of each heterogeneous item;

b) posting by or on behalf of one or more of a plurality of buyers, via one or more respective entry terminals, contingently-binding bids associated with heterogeneous items, said contingently-binding bids of each buyer being binding unless withdrawn in response to an acceptance of another of said contingently-binding bids of said buyer for a different one of said heterogeneous items; and c) continuing an auction in respect of one of the heterogeneous items until a buyer posts a bid equal to the buy price thereof, or the seller associated with said heterogeneous item accepts a contingently-binding bid posted by a buyer in respect thereof, or the seller associated with said heterogeneous item withdraws said heterogeneous item from sale.

12. Computer-implemented apparatus for conducting an automated auction in respect of one of a plurality of heterogeneous items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software performing the steps of:

a) entering by or on behalf of a plurality of sellers, via respective entry terminals, heterogeneous items to be offered for sale in respective auctions, together with a seller-defined buy price in respect of each heterogeneous item;

b) posting by or on behalf of a plurality of buyers, via respective entry terminals, contingently-binding bids associated with one or more heterogeneous items, said contingently-binding bids being binding unless withdrawn in response to an acceptance of another of said contingently-binding bids for a different one of said heterogeneous items; and c) continuing an auction in respect of one of the heterogeneous items until a buyer posts a bid equal to the buy price thereof, or the seller associated with said heterogeneous item accepts a contingently-binding bid posted by a buyer in respect thereof, or the seller associated with said heterogeneous item withdraws said heterogeneous item from sale.

13. Computer-implemented apparatus for conducting an automated auction in respect of one of a plurality of heterogeneous items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software performing the steps of:

a) entering by or on behalf of a plurality of sellers, via respective entry terminals, heterogeneous items to be offered for sale in respective auctions, together with a seller-defined buy price in respect of each heterogeneous item; and b) posting by or on behalf of a single buyer, via a respective entry terminal, a bid basket comprising a plurality of contingently-binding bids associated with a at least two of said heterogeneous items, said contingently-binding bids being binding unless withdrawn in response to an acceptance of another of said contingently-binding bids for a different one of said heterogeneous items.

14. Computer-implemented apparatus for conducting an automated auction in respect of one of a plurality of heterogeneous items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software performing the steps of:

a) entering by or on behalf of a plurality of sellers, via respective entry terminals, heterogeneous items to be offered for sale in respective auctions, together with a seller-defined buy price in respect of each heterogeneous item, wherein the buy price of a heterogeneous item is variable during the course of a respective auction;

b) posting by or on behalf of a plurality of buyers, via respective entry terminals, contingently-binding bids associated with one of said heterogeneous items, said contingently-binding bids being binding unless withdrawn in response to an acceptance of another of said contingently-binding bids for a different one of said heterogeneous items; and c) continuing an auction in respect of said one of said heterogeneous items until a buyer posts a bid equal to the buy price thereof, or the seller associated with said one of said heterogeneous items accepts a contingently-binding bid posted by a buyer in respect thereof, or the seller associated with said one of said heterogeneous items withdraws said one of said heterogeneous items from sale.

15. Computer-implemented apparatus for conducting in respect of a single buyer a plurality of automated auctions in respect of a plurality of respective heterogeneous items for sale in a system including a plurality of entry terminals operable by respective buyers and sellers and a database containing information relating to said buyers and sellers and items for sale, wherein said database is communicably coupled via the Internet to said entry terminals, the apparatus comprising an Internet auction site for conducting said automated auctions using said information contained in said database and to facilitate a transaction between said buyer and one of said sellers as a result of one of said auctions, the Internet auction site performing the steps of:

a) entering by or on behalf of a plurality of sellers, via respective entry terminals, data relating to respective heterogeneous items to be offered for sale; and b) posting by or on behalf of a single buyer, via an entry terminal, a bid basket comprising contingently-binding bids respectively associated with a plurality of heterogeneous items, said contingently-binding bids being binding unless withdrawn in response to an acceptance of another of said contingently-binding bids for a different one of said heterogeneous items.

16. Apparatus according to claim 15, further arranged and configured to terminate an auction in respect of a heterogeneous item when the seller associated with said heterogeneous item accepts a buyer's contingently-binding bid for said heterogeneous item, or when a buyer bids the seller's buy price for said heterogeneous item, or when a buyer withdraws a contingently-binding bid for said item.

17. Apparatus according to claim 15, wherein data relating to a heterogeneous item to be offered for sale includes a seller-defined buy price in respect of said heterogeneous item.

18. Apparatus according to claim 15, wherein an auction for an item is terminated when said buyer posts a bid equal to the buy price for said heterogeneous item.

19. A method for conducting in respect of a single buyer a plurality of automated auctions in respect of a plurality of respective heterogeneous items for sale in a system including a plurality of entry terminals operable by respective buyers and sellers and a database containing information relating to said buyers and sellers and items for sale, wherein said database is communicably coupled via the Internet to said entry terminals, the method comprising providing an Internet auction site for conducting said automated auctions using said information contained in said database and to facilitate a transaction between a buyer and one of said sellers as a result of one of said auctions, the Internet auction site performing the steps of:

a) entering by or on behalf of a plurality of sellers, via respective entry terminals, data relating to respective heterogeneous items to be offered for sale;

b) posting by or on behalf of a buyer, via an entry terminal, a bid basket comprising contingently-binding bids respectively associated with a plurality of heterogeneous items, said contingently-binding bids being binding unless withdrawn in response to an acceptance of another of said contingently-binding bids for a different one of said heterogeneous items; and c) terminating all of said auctions when a seller associated with one of the heterogeneous items accepts said buyer's bid for the respective heterogeneous item.

20. Computer-implemented apparatus for conducting an automated auction in respect of one of a plurality of heterogeneous items for sale in a system including a plurality of entry terminals operable by respective buyers and sellers, a database containing information relating to said buyers and sellers and items for sale via an auction, and a processor, wherein said database is communicably coupled to said entry terminals, the apparatus comprising computer software for execution by said processor to conduct said automated auction using said information contained in said database and to facilitate a transaction between a buyer and a seller as a result of said auction, the computer software performing the steps of:

a) entering by or on behalf of a plurality of sellers, via respective entry terminals, heterogeneous items to be offered for sale in respective auctions, together with a seller-defined buy price and a supply-withdrawal rule in respect of each heterogeneous item, said supply-withdrawal rules defining circumstances in which respective heterogeneous items are to be considered withdrawn;

b) posting by or on behalf of a plurality of buyers, via respective entry terminals, contingently-binding bids associated with said heterogeneous items, said contingently-binding bids being binding unless withdrawn in response to an acceptance of another of said contingently-binding bids for a different one of said heterogeneous items; and c) continuing an auction in respect of one of the heterogeneous items until a buyer posts a bid equal to the buy price thereof, or the seller associated with said heterogeneous item accepts a contingently-binding bid posted by a buyer in respect thereof, or the seller associated with said heterogeneous item withdraws said heterogeneous item from sale.

\* \* \* \* \*